United States Patent
Ochiai et al.

(10) Patent No.: US 10,381,695 B2
(45) Date of Patent: Aug. 13, 2019

(54) COOLING SYSTEM FOR SECONDARY BATTERY

(71) Applicant: TOYOTA JIDOSHA KABUSHIKI KAISHA, Toyota-shi, Aichi-ken (JP)

(72) Inventors: Kiyoe Ochiai, Nagoya (JP); Junta Izumi, Nagoya (JP); Kiyohito Machida, Nissin (JP); Masakazu Habu, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 337 days.

(21) Appl. No.: 15/092,089

(22) Filed: Apr. 6, 2016

(65) Prior Publication Data

US 2016/0301116 A1    Oct. 13, 2016

(30) Foreign Application Priority Data

Apr. 20, 2015 (JP) .................................. 2015-081078

(51) Int. Cl.
*H01M 10/0525* (2010.01)
*H01M 10/633* (2014.01)
(Continued)

(52) U.S. Cl.
CPC ...... *H01M 10/633* (2015.04); *B60H 1/00335* (2013.01); *B60L 3/0046* (2013.01); *B60L 58/26* (2019.02); *H01M 10/0525* (2013.01); *H01M 10/345* (2013.01); *H01M 10/625* (2015.04); *H01M 10/6563* (2015.04);
(Continued)

(58) Field of Classification Search
CPC ............ B60L 2240/545; B60L 11/1874; B60L 3/0046; B60H 1/002789; B60H 2001/003; B60H 1/00335; B60H 1/00392
See application file for complete search history.

(56) References Cited

U.S. PATENT DOCUMENTS

| | | |
|---|---|---|
| 5,937,664 A | 8/1999 | Matsuno et al. |
| 2007/0298315 A1 | 12/2007 | Yamamoto et al. |

(Continued)

FOREIGN PATENT DOCUMENTS

| | | |
|---|---|---|
| CN | 102892991 A | 1/2013 |
| CN | 104703838 A | 6/2015 |

(Continued)

*Primary Examiner* — Keith M Raymond
*Assistant Examiner* — Nael N Babaa
(74) *Attorney, Agent, or Firm* — Sughrue Mion, PLLC

(57) ABSTRACT

A secondary battery is installed on an electric vehicle and includes a cooling fan, a temperature sensor and a controller. The controller is configured to drive the cooling fan at a fixed command value for a predetermined period, when the temperature of the secondary battery becomes equal to or higher than a first predetermined temperature after the electric vehicle is started. The controller is configured to detect a presence or absence of an abnormality in the cooling fan based on an actual rotational speed of the cooling fan during the predetermined period. The controller is configured to inhibit driving of the cooling fan at the fixed command value when the temperature of the secondary battery is equal to or higher than a second predetermined temperature that is higher than the first predetermined temperature.

10 Claims, 11 Drawing Sheets

(51) Int. Cl.
  *B60H 1/00*   (2006.01)
  *H01M 10/625*  (2014.01)
  *H01M 10/6563* (2014.01)
  *H01M 10/34*   (2006.01)
  *B60L 3/00*    (2019.01)
  *B60L 58/26*   (2019.01)

(52) U.S. Cl.
  CPC ...... *B60H 1/00278* (2013.01); *B60H 1/00392* (2013.01); *B60H 2001/003* (2013.01); *B60L 2240/545* (2013.01); *B60L 2240/662* (2013.01); *B60L 2240/80* (2013.01); *B60L 2260/42* (2013.01); *H01M 2220/20* (2013.01); *Y02T 10/705* (2013.01); *Y02T 10/7011* (2013.01); *Y02T 10/7291* (2013.01); *Y02T 90/16* (2013.01)

(56) References Cited

U.S. PATENT DOCUMENTS

| | | | | |
|---|---|---|---|---|
| 2009/0024252 | A1* | 1/2009 | Aridome | B60K 6/445 |
| | | | | 700/275 |
| 2012/0015221 | A1* | 1/2012 | Murase | H01M 10/425 |
| | | | | 429/90 |
| 2013/0030643 | A1 | 1/2013 | Nishizawa | |
| 2015/0010802 | A1* | 1/2015 | Inoue | H01M 10/486 |
| | | | | 429/120 |
| 2015/0267708 | A1 | 9/2015 | Masuda et al. | |
| 2016/0107537 | A1 | 4/2016 | Marchal et al. | |

FOREIGN PATENT DOCUMENTS

| | | | | |
|---|---|---|---|---|
| JP | 200563682 | A | 3/2005 | |
| JP | 200748485 | A | 2/2007 | |
| JP | 2008-4386 | A | 1/2008 | |
| JP | 2009252477 | A | 10/2009 | |
| JP | 2010-158964 | A | 7/2010 | |
| JP | WO 2014058021 A1 * | 4/2014 | ............. B60K 6/485 |
| JP | 2014-76781 | A | 5/2014 | |
| JP | 2015-15151 | A | 1/2015 | |
| WO | 2014/058021 | A1 | 4/2014 | |
| WO | 2014/177800 | A1 | 11/2014 | |

* cited by examiner

COOLING SYSTEM FOR SECONDARY BATTERY

CROSS REFERENCE TO RELATED APPLICATIONS

The disclosure of Japanese Patent Application No. 2015-081078 filed on Apr. 10, 2015 including the specification, drawings and abstract is incorporated herein by reference in its entirety.

BACKGROUND

1. Field

This disclosure relates to a cooling system that cools a secondary battery for driving a vehicle.

2. Description of Related Art

In an electric vehicle, such as a hybrid vehicle or an electric-powered vehicle, a secondary battery (battery) that stores electric energy for driving the vehicle is installed. Since the secondary battery has internal resistance, and its temperature rises due to charging or discharging, it is necessary to cool the secondary battery. Thus, it has been proposed to provide a cooling fan around the secondary battery, and forcedly cool the secondary battery by air, using the cooling fan.

For example, a cooling system for vehicular electric components in which a cooling fan is provided in the vicinity of a secondary battery is disclosed in Japanese Patent Application Publication No. 2010-158964 (JP 2010-158964 A). In the system of JP 2010-158964 A, a duct in which cooling air produced by driving of the cooling fan flows diverges midway in two directions, so as to allow switching of channels of the cooling air, according to the temperature of a charger installed on the vehicle. In this cooling system, a command duty of the cooling fan is changed according to the temperatures of high-voltage secondary battery and vehicle-mounted charger to be cooled. The cooling system also detects the presence or absence of a fault of the cooling fan. If a fault is detected, the cooling system outputs the detection result to a diagnostic system, and changes control of the electric components according to the content of the fault.

The presence or absence of an abnormality in the cooling fan is often determined based on detected parameters, such as the actual rotational speed of the cooling fan. Thus, the presence or absence of an abnormality is desirably determined in a steady state in which the cooling fan is stably driven. This is because, if the drive status (such as the fan rotational speed) of the cooling fan varies largely, errors caused by control delay, or the like, may be included in the detected parameters, and the accuracy in detection of a fault cannot be kept sufficiently high.

The cooling system of JP 2010-158964 A, in which the command duty is changed according to the temperatures of the high-voltage secondary battery and the charger, is unlikely to be placed in a steady state; therefore, it is difficult to accurately determine the presence or absence of an abnormality in the cooling fan. Thus, it may be considered to drive the cooling fan at a fixed duty (fixed rotational speed), without changing the command duty (command rotational speed) of the cooling fan. In this case, the drive status of the cooling fan is stabilized, and therefore, the presence or absence of an abnormality can be accurately determined. However, if the cooling fan is constantly driven at the fixed duty (fixed rotational speed), irrespective of the status of the secondary battery and traveling conditions, the secondary battery may not be sufficiently cooled because of insufficient rotational speed, and may be deteriorated, or, conversely, unnecessarily high rotational speed of the cooling fan may result in unnecessary noise and electric power consumption.

SUMMARY

Thus, the disclosure is to provide a cooling system that appropriately cools a secondary battery for driving a vehicle, while assuring sufficient chances of detection of an abnormality in a cooling fan.

A cooling system related to the present disclosure is for a secondary battery. The secondary battery is installed on an electric vehicle for driving the electric vehicle. The cooling system includes a cooling fan configured to send cooling air to the secondary battery, a temperature sensor configured to detect a temperature of the secondary battery, and a controller. The cooling fan is configured to be driven based on a command value. The command value is a parameter that determines a rotational speed of the cooling fan. The controller is configured to drive the cooling fan at a fixed command value for a predetermined period, when the temperature of the secondary battery becomes equal to or higher than a first predetermined temperature after the electric vehicle is started. The controller is configured to detect a presence or absence of an abnormality in the cooling fan based on an actual rotational speed of the cooling fan during the predetermined period. The controller is configured to inhibit driving of the cooling fan at the fixed command value when the temperature of the secondary battery is equal to or higher than a second predetermined temperature that is higher than the first predetermined temperature.

With the above arrangement, the cooling system of this disclosure assures sufficient chances of abnormality detection processing on the cooling fan when the temperature of the secondary battery is low at the start of the electric vehicle. Also, the cooling system curbs deterioration of the secondary battery, by giving higher priority to cooling of the secondary battery than to assurance of chances of abnormality detection processing on the cooling fan when the temperature of the secondary battery at the start of the electric vehicle is high. It is thus possible to appropriately cool the secondary battery, while assuring sufficient chances of detection of an abnormality in the cooling fan.

The second predetermined temperature may be set to be lower as a degree of deterioration of the secondary battery is larger.

With the above arrangement, it is possible to appropriately assure chances of abnormality detection processing on the cooling fan, while curbing deterioration of the secondary battery.

When a highest temperature of the secondary battery is higher than a predetermined value over a plurality of trips, the second predetermined temperature may be set to a lower value as compared with a case where the highest temperature of the secondary battery is lower than or equal to the predetermined value over the plurality of trips.

With the above arrangement, it is possible to appropriately assure chances of abnormality detection processing on the cooling fan, while curbing deterioration of the secondary battery. Here, the trip is a period from the time when an electronic control unit (ECU) of the electric vehicle is started, to the time when the ECU is stopped after a predetermined traveling of the vehicle.

The fixed command value may be set to a smaller value than a variable command value that is set when control is performed such that the command value can be varied according to the temperature of the secondary battery.

With the above arrangement, it is possible to curb reduction of the fuel efficiency, without making the user uncomfortable due to noise of the cooling fan.

When the temperature of the secondary battery is higher than a third predetermined temperature that is equal to or higher than the first predetermined temperature and lower than the second predetermined temperature, the fixed command value may be set to a larger value than a variable command value. The variable command value may be set when control is performed such that the command value can be varied according to the temperature of the secondary battery.

With the above arrangement, when the temperature of the secondary battery at the start of the electric vehicle is in a high region within a temperature range in which the abnormality detection processing for the cooling fan is not inhibited, the secondary battery can be effectively cooled, and deterioration of the secondary battery can be curbed.

When the temperature of the secondary battery is lower than the first predetermined temperature when the electric vehicle is started, and exceeds the first predetermined temperature for the first time after starting of the electric vehicle, the fixed command value may be set to a minimum value among command values for driving the cooling fan.

With the above arrangements, it is possible to curb reduction of the fuel efficiency, without making the user uncomfortable due to noise of the cooling fan.

When an input-output electric power of the secondary battery is smaller than a given threshold value, the fixed command value may be set to a minimum value among command values for driving the cooling fan.

With the above arrangements, it is possible to curb reduction of the fuel efficiency, without making the user uncomfortable due to noise of the cooling fan.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
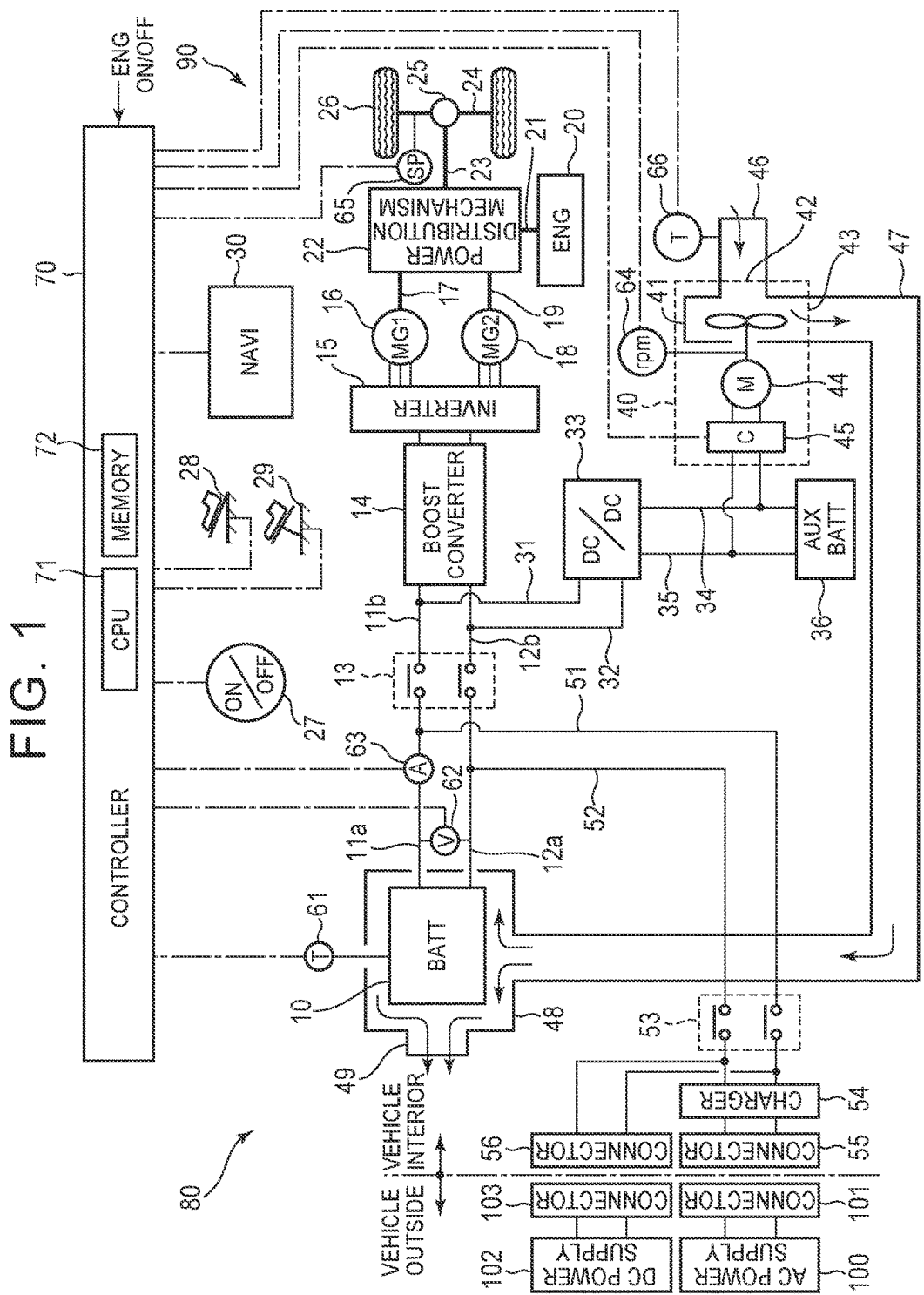
FIG. 1 is a system diagram showing the configuration of a cooling system for a vehicle-mounted secondary battery according to a disclosed embodiment.

Exemplary embodiments will be described with reference to the drawings. In an exemplary embodiment, the system configuration of an electric vehicle 90 on which a cooling system 80 for a vehicle-mounted secondary battery is installed will be described. In FIG. 1, one-dot chain lines indicate signal lines. A main battery 10 for driving the vehicle is connected, via a positive-side bus bar 11a and a negative-side bus bar 12a, to positive-side and negative-side input terminals of a system main relay 13, respectively. The main battery 10 is a chargeable and dischargeable secondary battery, such as a nickel hydride battery, or a lithium-ion battery. The positive-side output terminal and the negative-side output terminal of the system main relay 13 are respectively connected, via positive-side and negative-side bus bars 11b, 12b, to a boost converter 14. Positive-side and negative-side output terminals of the boost converter 14 are respectively connected to positive-side and negative-side input terminals of an inverter 15. Three output bus bars of U-phase, V-phase and W-phase are connected to the inverter 15, and each of the output bus bars is connected to an input terminal of each phase of first and second motor-generators (M, M) 16, 18. Output shafts 17, 19 of the respective motor-generators 16, 18 are connected to a power distribution mechanism 22 using a planetary gear set, or the like. An output shaft 21 of an engine 20 is also connected to the power distribution mechanism 22. An output shaft 23 of the power distribution mechanism 22 drives wheels 26 via a gear mechanism 25, and axles 24. A vehicle speed sensor 65 is mounted on the axle 24 so as to detect the vehicle speed from the rotational speed of the axle 24.

A positive-side bus bar 51 and a negative-side bus bar 52 branch off from the positive-side bus bar 11a and negative-side bus bar 12a, respectively, which are connected to the main battery 10. A charger 54 is connected to the respective bus bars 51, 52, via a charge relay 53. The charger 54 is operable to convert electric power from an external AC power supply, into charging power with which the main battery 10 is to be charged. A connector 55 (a so-called "inlet") is connected to the charger 54. The connector 55 can be connected to a connector 101 (a so-called "charge plug") of an AC power supply 100 (e.g., a commercial power supply). With the connector 101 connected to the connector 55, the main battery 10 can be charged with power from the AC power supply 100. A connector 56 to which a connector 103 of an external DC power supply 102 can be connected is also connected, via the charge relay 53, to the positive-side and negative-side bus bars 51, 52. With this arrangement, the main battery 10 can also be charged with power from the external DC power supply 102.

As mentioned above, the positive-side output terminal and negative-side output terminal of the system main relay 13 to which the main battery 10 is connected are connected to the positive-side and negative-side bus bars 11b, 12b, respectively. A DC/DC converter 33 is connected to the positive-side and negative-side bus bars 11b, 12b, via positive-side and negative-side bus bars 31, 32, respectively. Output terminals of the DC/DC converter 33 are connected to an auxiliary battery 36 via positive-side and negative-side low-voltage bus bars 34, 35. The DC/DC converter 33 steps down the voltage of the main battery 10 to that of an auxiliary, such as 12V or 24V, for use in charging of the auxiliary battery 36. A cooling fan 40 is connected to the low-voltage bus bars 34, 35. The cooling fan 40 consists of a fan main body 41 in which impellers are housed, a motor 44 for driving the impellers, and a control unit 45 that performs speed control of the motor 44. The control unit 45 is connected to the low-voltage bus bars 34, 35. A suction duct 46 for drawing cooling air in is connected to a suction port 42 of the fan main body 41. A connection duct 47 that supplies cooling air to a casing 48 in which the main battery 10 is housed is connected to a discharge port 43 of the fan main body 41 such that air may be supplied to the casing 48 to thereby cool the main battery 10. An exhaust air duct 49 through which the air that has cooled the main battery 10 is discharged is attached to the casing 48. In the above-described embodiment, the main battery 10 is cooled with air delivered from the cooling fan 40. However, the cooling arrangement is not limited to the above-described arrangement. For example, the cooling fan 40 may be located on the exhaust air duct 49 side, and the cooling fan 40 may be driven so as to develop a negative pressure in the casing 48, whereby cooling air is delivered to the main battery 10. In this embodiment, the motor 44 for driving the cooling fan 40 may be a DC motor or an AC motor.

In the vehicle interior of the electric vehicle 90, an ignition switch 27 that outputs signals for turning the electric vehicle 90 on and off, an accelerator pedal 28, and a brake pedal 29 are installed in position. Also, a navigation system 30 that detects the current position of the electric vehicle 90 and provides route guidance, or the like, to a destination is installed in the vehicle interior.

A temperature sensor 61 that detects the temperature of the main battery 10 is mounted on the main battery 10. Also, a voltage sensor 62 that detects the voltage of the main battery 10 is connected between the positive-side and negative-side bus bars 11a, 12a connected to the main battery 10. A current sensor 63 that detects charge/discharge current of the main battery 10 is mounted in the positive-side bus bar 11a between the main battery 10 and the system main relay 13. Also, a rotational speed sensor 64 that detects the rotational speed of the motor 44 is mounted in the cooling fan 40, and a temperature sensor 66 that detects the intake air temperature is mounted in the suction duct 46.

As shown in FIG. 1, the control unit 45 of the cooling fan 40 is connected to a controller 70 The cooling fan 40 is driven according to a command of the controller 70. The ignition switch 27, the temperature sensors 61, 66, the voltage sensor 62, the current sensor 63, the rotational speed sensor 64, and the vehicle speed sensor 65 are also connected to the controller 70. The controller 70 receives a turn-on signal and a turn-off signal from the ignition switch 27, and detection signals from the sensors 61, 62, 63, 64, 65, 66. The controller 70 is also configured to receive signals indicating the operation amount of the accelerator pedal 28, and the depression amount of the brake pedal 29. The controller 70 is a computer incorporating a CPU 71 that performs arithmetic processing and signal processing, and a memory 72 that stores control data, maps for use in control, programs, and so forth. The controller 70 also receives an ON/OFF signal indicating whether the engine 20 is operating or stopped, from another control unit.

The basic operation of the electric vehicle 90 constructed as described above will now be described. When the ignition switch 27 is turned on, so that the ECU is started and the electric vehicle 90 is brought into an ON state, the system main relay 13 is switched on, and DC power of the main battery 10 is supplied from the inverter 15 to the respective motor-generators 16, 18, via the boost converter 14. Here, the electric vehicle 90 being in the ON state means a condition where the electric vehicle 90 is started, and the ECU of the electric vehicle 90 is started. Throughout the remainder of this specification, the statement that the electric vehicle 90 is started is equivalent to the statement that the ECU is started and the electric vehicle 90 is in the ON state. Also, the electric vehicle 90 being in an OFF state means a condition where the ECU of the electric vehicle 90 is stopped.

With electric power thus supplied to each of the motor-generators 16, 18, the controller 70 starts the first motor-generator 16, and starts the engine 20. The output of the engine 20 is divided by the power distribution mechanism 22, and a part of the output is used for driving the first motor-generator 16, while the remaining output and the output of the second motor-generator 18 functioning as a motor are delivered from the power distribution mechanism 22 to the output shaft 23, so as to rotate the wheels 26 and run the electric vehicle 90. The first motor-generator 16 functions as a generator, and the AC power thus generated is consumed as electric power for driving the second motor-generator 18. In addition, the main battery 10 supplies required electric power to the second motor-generator 18, through discharging. On the other hand, when electric power generated by the first motor-generator 16 is larger than the power needed by the second motor-generator 18, the redundant AC power thus generated is converted by the inverter 15 into DC power, with which the main battery 10 is charged. When the electric vehicle 90 is decelerated, the second motor-generator 18 functions as a generator, and reduces rotation of the wheels 26. The AC power generated by the second motor-generator 18 during deceleration is converted by the inverter 15 into DC power, with which the main battery 10 is charged.

Figure 2:
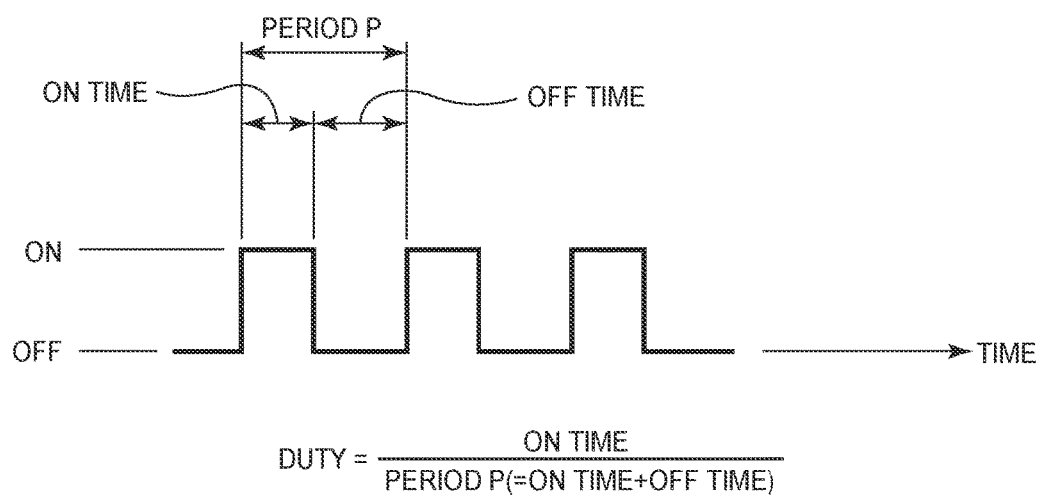
FIG. 2 is an exemplary chart depicting duty control of the cooling system of FIG. 1.

The rotational speed of the motor 44 of the cooling fan 40 is controlled under "duty control." The duty control is a control mode in which the voltage applied to the motor 44 is periodically switched between ON and OFF, as shown in FIG. 2. The "duty" as the ratio (ON time/(Period P=ON time+OFF time) of the ON time to the ON-OFF period (Period P=ON time+OFF time) is changed.

$$\text{Duty=ON time/Period } P\text{=ON time/(ON time+OFF time)} \quad \text{(Eq. 1)}$$

When the duty is equal to zero, no voltage is applied to the motor 44; therefore, the cooling fan 40 is not driven. When the duty is equal to 100% (MAX duty), the voltage of the low-voltage bus bars 34, 35 is applied as it is to the motor 44. When the duty is between zero and 100%, an average voltage applied to the motor 44 is obtained by multiplying the voltage of the low-voltage bus bars 34, 35 by the duty.

Figure 3:
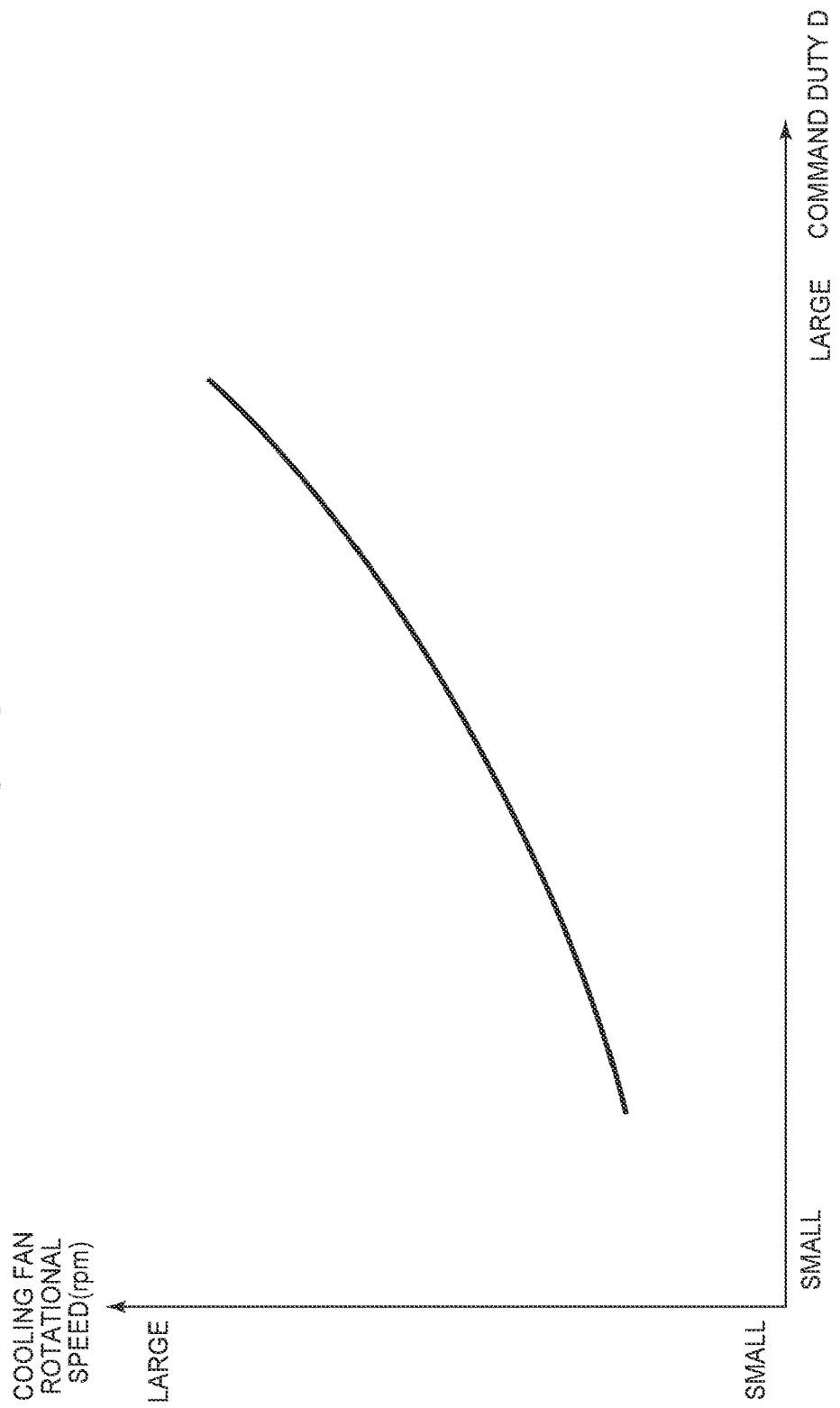
FIG. 3 is a graph indicating the rotational speed of a cooling fan of the cooling system of FIG. 1 with respect to a command duty.

Since there is a specific relationship between the rotational speed of the motor 44 and the duty, as shown in FIG. 3, the rotational speed of the motor 44, i.e., the rotational speed of the cooling fan 40, can be adjusted to a desired speed, by adjusting the duty through duty control. Also, since there is a specific relationship between the rotational speed of the cooling fan 40 and the air quantity, the air quantity of the cooling fan 40 can be adjusted to a desired quantity, by adjusting the duty. The control unit 45 of the cooling fan 40 incorporates a switching device for permitting and inhibiting passage of current, and selectively permits current to be supplied to the motor 44 or inhibits current from being supplied to the motor 44, according to a command duty D received from the controller 70. Accordingly, the command duty D is a command value for driving the cooling fan 40.

Figure 4:
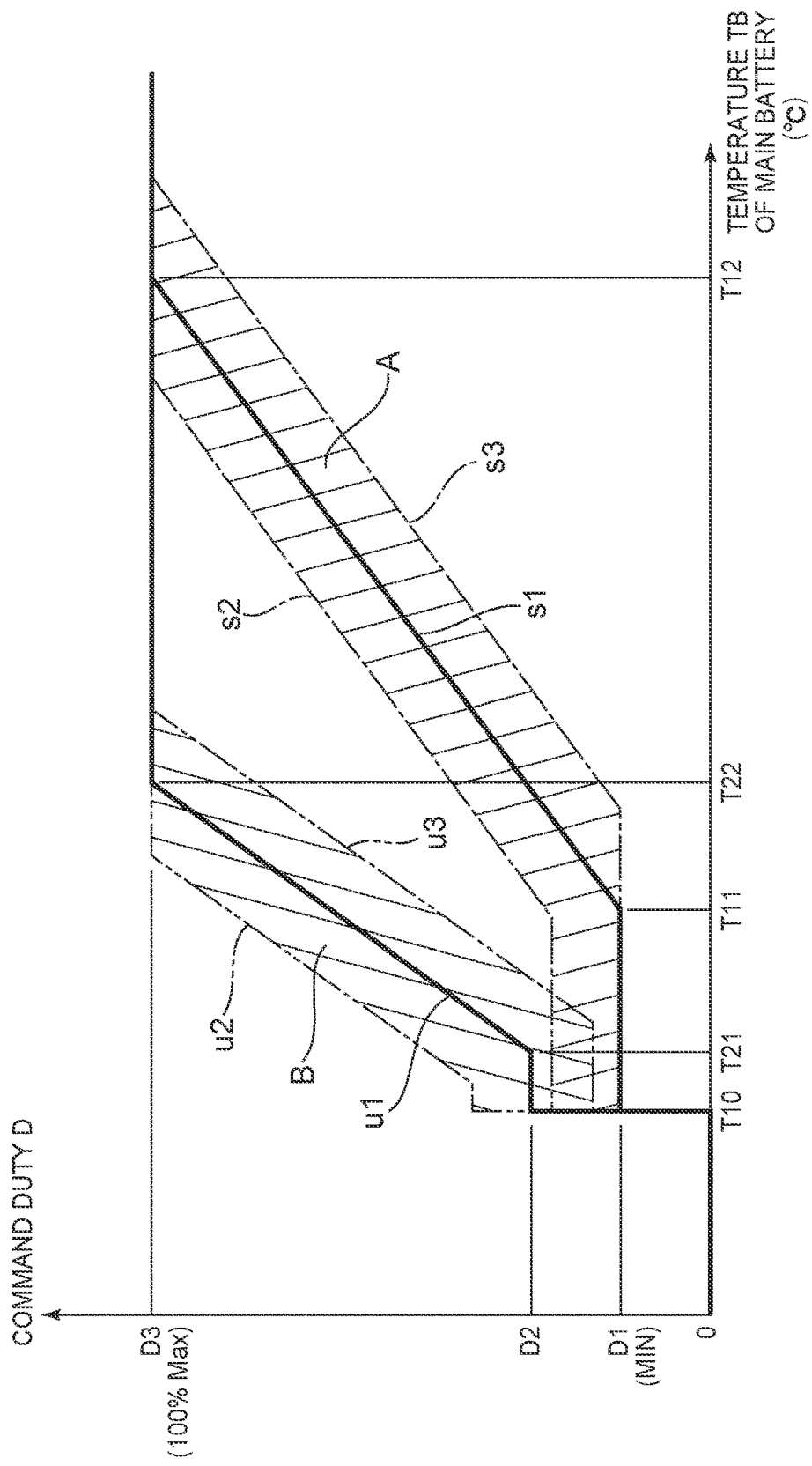
FIG. 4 is a duty map used for determining a command duty.

The controller 70 determines the command duty D of the cooling fan 40 based on a duty map plotted according to detected parameters, such as the temperature TB of the main battery 10, a temperature difference ΔT between the intake air temperature of the cooling fan 40 detected by the temperature sensor 66 and the temperature TB of the main battery 10 detected by the temperature sensor 61, and the vehicle speed Vel detected by the vehicle speed sensor 65. Then, the controller 70 outputs the command duty D to the control unit 45. While various types of maps may be employed as the duty map, one example of the duty map is shown in FIG. 4. In FIG. 4, solid line s1 is a reference line that specifies the command duty D relative to the temperature TB of the main battery 10 when the outside air temperature is in the vicinity of "normal temperature," and the temperature difference ΔT between the temperature TB of the main battery 10 and the intake air temperature of the cooling fan 40 is large. In this case, as indicated by solid line s1 of FIG. 4, the command duty D is set to zero until the temperature TB of the main battery 10 reaches temperature T10, and is set to the minimum value D1 (MIN) while the temperature TB of the main battery 10 is between temperature T10 and temperature T11. The minimum value D1 is the minimum duty, e.g., around 10%, at which the rotational speed of the motor 44 can be stably controlled under duty control. If the temperature TB of the main battery 10 exceeds temperature T11, the command duty D increases as the temperature TB of the main battery 10 rises. If the temperature TB of the main battery 10 reaches temperature T12, the command duty D is set to the maximum value D3 (MAX, 100% duty). T10, T11, T12 may assume various values depending on characteristics of the main battery 10, the type of the battery (nickel hydride battery or lithium-ion battery), and so forth. As one example, T10 may be around 36° C., T11 may be around 38° C., and T12 may be around 45° C.

The command duty D may be determined so as to reflect a detected parameter(s), such as the vehicle speed Vel of the electric vehicle 90, other than the temperature TB of the main battery 10. For example, when the vehicle speed Vel of the electric vehicle 90 is high, the required power is large, and the input/output electric power of the main battery 10 becomes large; therefore, the command duty D is increased from solid line s1 to one-dot chain line s2 in FIG. 4. Conversely, when the vehicle speed Vel of the electric vehicle 90 is low, the required power is small, and the input/output power of the main battery 10 does not become so large; therefore, the command duty D is reduced from solid line s1 to one-dot chain line s3 in FIG. 4. Thus, even when the temperature difference ΔT between the temperature TB of the main battery 10 and the intake air temperature of the cooling fan 40 is constant, the command duty D varies within a hatched region A between one-dot chain lines s2 and s3 of FIG. 4, depending on the detected parameter(s), such as the vehicle speed Vel of the electric vehicle 90.

When the outside air temperature is high, i.e., above "normal temperature," and the temperature difference ΔT between the temperature TB of the main battery 10 and the intake air temperature of the cooling fan 40 is small, a larger quantity of air is needed for cooling the main battery 10. In this case, the command duty D is set to be higher than that of solid line s1 as explained above, and solid line u1 of FIG. 4 provides a reference line that specifies the command duty D relative to the temperature TB of the main battery 10. In this case, the command duty D is set to zero until the temperature TB of the main battery 10 reaches temperature T10, and is set to D2 while the temperature TB of the main battery 10 is between temperature T10 and temperature T21 (that is lower than T11). With the command duty D set to D2, the quantity of air required for cooling the main battery 10 can be supplied when the temperature difference ΔT between the temperature TB of the main battery 10 and the intake air temperature of the cooling fan 40 is small. If the temperature TB of the main battery 10 exceeds temperature T21, the command duty D increases as the temperature TB of the main battery 10 rises. If the temperature TB of the main battery 10 then reaches temperature T22, the command duty D becomes equal to the maximum value D3 (MAX, 100% duty). As should be appreciated from FIG. 4, the rate of increase of the command duty D along solid line u1 with respect to the temperature TB of the main battery 10 is larger than that in the case of solid line s1 as explained above. As in the case where the temperature difference ΔT is large as explained above, the command duty D varies within a hatched region B between two-dot chain lines u2 and u3 of FIG. 4, depending on the detected parameter(s), such as the vehicle speed Vel of the electric vehicle 90, for example. T21 and T22 may assume various values, like T10, T11, and T12. As one example, T21 may be around 37° C., and T22 may be around 42° C.

The controller 70 may determine the command duty D (command value for driving the cooling fan 40) of the cooling fan 40 based on the duty map as explained above, and then output the command duty D to the control unit 45. Accordingly, the command duty D undergoes various changes, depending on detected parameters, such as the temperature TB of the main battery 10, the temperature difference ΔT between the temperature TB of the main battery 10 and the intake air temperature of the cooling fan 40, the vehicle speed Vel, and various other parameters.

Figure 5:
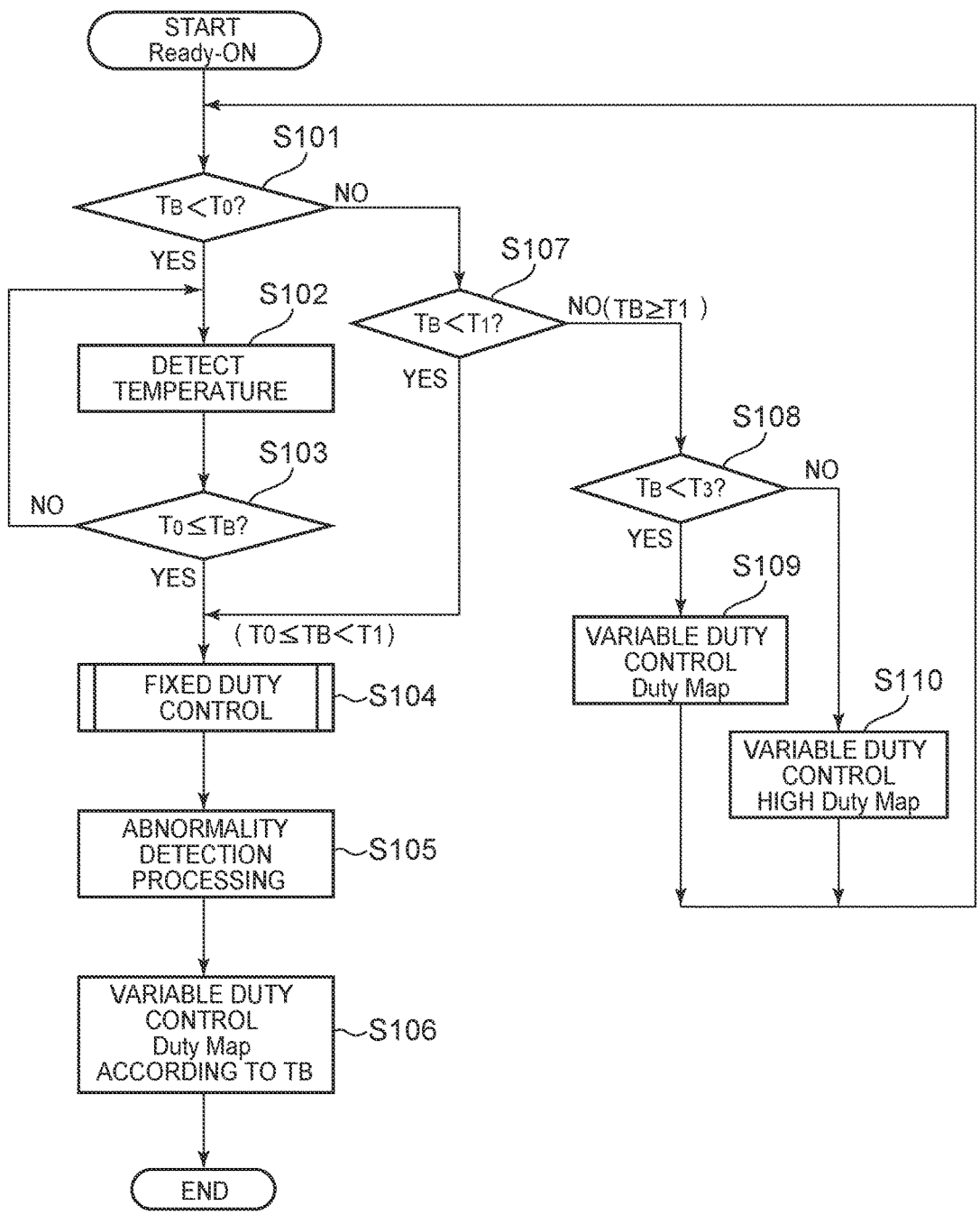
FIG. 5 is a flowchart illustrating operation of the cooling system of FIG. 1 for the vehicle-mounted secondary battery according to the disclosed embodiment.
Figure 6:
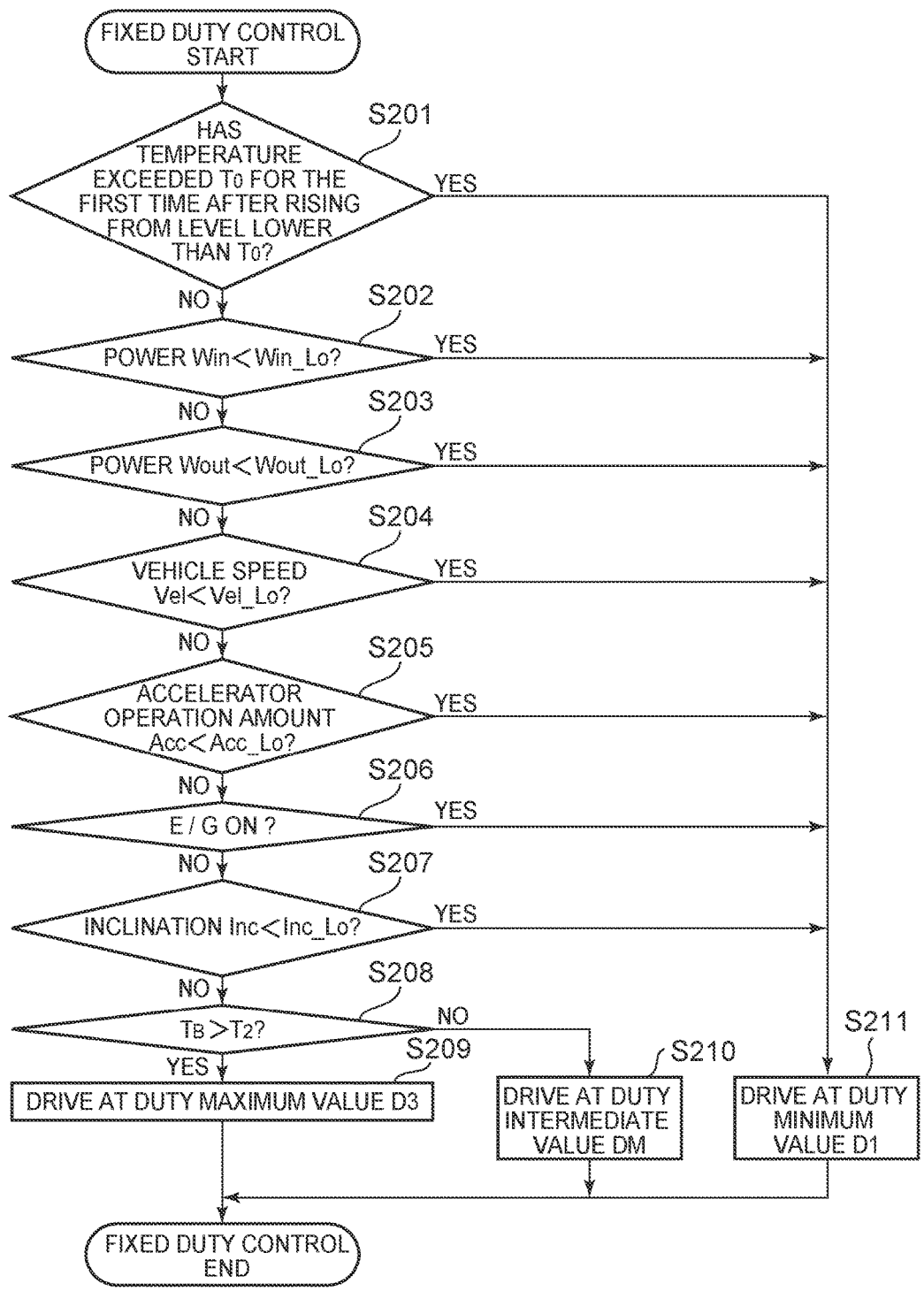
FIG. 6 is a flowchart illustrating an abnormality detection processing routine under fixed-duty control shown in FIG. 5.

Referring next to FIG. 5 and FIG. 6, the operation of the cooling system 80 of the vehicle-mounted secondary battery will be described. Once the electric vehicle 90 is placed in the ON state (in which the electric vehicle 90 is started, and the ECU is started), the controller 70 causes the temperature sensor 61 to detect the temperature TB of the main battery 10, and compares the temperature TB with a first predetermined temperature T0. Here, the first predetermined temperature T0 is set to a temperature at which the main battery 10 need not be cooled, but would be excessively cooled if the cooling fan 40 is driven and the main battery 10 is cooled. The first predetermined temperature T0 is, for example, around 36° C.

If the temperature TB of the main battery 10 is lower than the first predetermined temperature T0, the controller 70 makes an affirmative decision (YES) in step S101, and proceeds to steps S102, S103 of FIG. 5, to detect the temperature TB of the main battery 10, and waits until the temperature TB of the main battery 10 becomes equal to or higher than the first predetermined temperature T0. If the temperature TB of the main battery 10 rises to the first predetermined temperature T0, the controller 70 makes an affirmative decision (YES) in step S103, and proceeds to step S104 of FIG. 5, to perform fixed duty control for driving the cooling fan 40 at a fixed duty for a predetermined period. Then, the controller 70 proceeds to step S105, to perform abnormality detection processing for detecting the presence or absence of an abnormality in the cooling fan 40.

In the abnormal detection processing, the actual rotational speed of the motor 44, namely, the actual rotational speed of the cooling fan 40, is detected by the rotational speed sensor 64 shown in FIG. 1 during a predetermined period in which the fixed duty control is performed on the cooling fan 40, and the actual rotational speed is compared with a fixed target rotational speed based on the command duty D. If a difference between the target rotational speed and the actual rotational speed, or an absolute value of the difference, is equal to or larger than a given threshold value, the controller 70 determines that there is an abnormality in the cooling fan 40, and may output a fan abnormality signal to a diagnostic system, for example. If the difference is smaller than the given threshold value, the controller 70 determines that there is no abnormality in the cooling fan 40, and may output a fan normality signal to the diagnostic system, for example. Here, the predetermined period is a period long enough to enable the controller 70 to determine a difference between the actual rotational speed of the cooling fan 40 and the target rotational speed based on the command duty, and may be a period of several seconds to several minutes, for example.

If the temperature TB of the main battery 10 is equal to or higher than the first predetermined temperature T0, the controller 70 makes a negative decision (NO) in step S101, and proceeds to step S107 of FIG. 5, to determine whether the temperature TB of the main battery 10 is lower than a second predetermined temperature T1. Here, the second predetermined temperature T1 is set to a temperature at which the main battery 10 would not be affected even if the command duty D is set to a fixed value and the cooling fan 40 is driven at the fixed command duty D. For example, the second predetermined temperature T1 is around 40° C. If the temperature TB of the main battery 10 is lower than the second predetermined temperature T1, the controller 70 makes an affirmative decision (YES) in step S107 of FIG. 5, and proceeds to step S104 of FIG. 5, to perform fixed duty control for driving the cooling fan 40 at a fixed duty, for the predetermined period. Then, the controller 70 proceeds to step S105, to perform abnormality detection processing for detecting the presence or absence of an abnormality in the cooling fan 40.

As described above, when the temperature TB of the main battery 10 detected when the vehicle 90 is placed in the ON state is equal to or higher than the first predetermined temperature T0 and lower than the second predetermined temperature T1, the controller 70 performs fixed duty control for driving the cooling fan 40 at a fixed duty for the predetermined period, as shown in step S104 of FIG. 5, and proceeds to step S105 to perform abnormality detection processing for detecting the presence or absence of an abnormality in the cooling fan 40. When the temperature TB of the main battery 10 detected when the vehicle 90 is placed in the ON state is equal to or higher than the second predetermined temperature T1, the controller 70 inhibits fixed duty control of the cooling fan 40, and proceeds to step S108 of FIG. 5.

If the temperature TB of the main battery 10 detected when the vehicle 90 is placed in the ON state is equal to or higher than the second predetermined temperature T1 and lower than a fourth predetermined temperature T3, the controller 70 makes an affirmative decision (YES) in step S108 of FIG. 5, and proceeds to step S109 of FIG. 5, to drive the cooling fan 40, using variable duty control under which the command duty D is varied within the region A (normal duty map) of the duty map shown in FIG. 4. The region A specifies the command duty D relative to the temperature TB of the main battery 10, for the case where the outside air temperature is around "normal temperature," and the temperature difference ΔT between the temperature TB of the main battery 10 and the intake air temperature of the cooling fan 40 is large. On the other hand, if the temperature TB of the main battery 10 detected when the vehicle 90 is placed in the ON state is equal to or higher than the fourth predetermined temperature T3, the controller 70 makes a negative decision (NO) in step S108 of FIG. 5, and proceeds to step S110 of FIG. 5, to drive the cooling fan 40, using variable duty control under which the command duty D is varied within the region B (high duty map) of the duty map shown in FIG. 4. The region B specifies the command duty D relative to the temperature TB of the main battery 10, for the case where the outside air temperature is high, and the temperature difference ΔT between the temperature TB of the main battery 10 and the intake air temperature of the cooling fan 40 is small. Here, the fourth predetermined temperature T3 is a temperature at which the main battery 10 needs to be rapidly cooled, and may be around 45° C., for example. A third predetermined temperature T2 will be described later with reference to FIG. 6.

After starting the variable duty control in steps S109, S110 of FIG. 5 to change the command duty based on the duty map shown in FIG. 4, the controller 70 returns to step S101 of FIG. 5, and monitors the temperature TB of the main battery 10. Then, if the temperature TB of the main battery 10 becomes lower than the fourth predetermined temperature T3, the controller 70 makes a shift from the variable duty control using the high duty map to the variable duty control using the normal duty map. If the temperature TB of the main battery 10 is further reduced to be lower than the second predetermined temperature T1, the controller 70 makes an affirmative decision (YES) in step S107 of FIG. 5, and jumps to step S104 of FIG. 5, to perform fixed duty control for driving the cooling fan 40 at a fixed duty for the predetermined period. Then, the controller 70 proceeds to step S105 to perform abnormality detection processing on the cooling fan 40.

After the controller 70 performs abnormality detection processing on the cooling fan 40 in step S105 of FIG. 5, it proceeds to step S106 of FIG. 5, and controls the cooling fan 40 under variable duty control based on the duty map of FIG. 4. Then, the operation illustrated in the flowchart of FIG. 5 ends. If the ignition switch 27 is turned off, during execution of the operation illustrated in the flowchart of FIG. 5, so that the ECU is stopped, and the electric vehicle 90 is placed in the OFF state, the controller 70 stops executing the control routine illustrated in the flowchart of FIG. 5, and ends the operation.

As explained above, when the temperature TB of the main battery 10 detected when the vehicle 90 is placed in the ON state is lower than the first predetermined temperature T0, the cooling system for the vehicle-mounted secondary battery of this embodiment performs fixed duty control and abnormality detection processing on the cooling fan 40, until the temperature TB of the main battery 10 reaches the first predetermined temperature T0. When the temperature TB of the main battery 10 detected when the vehicle 90 is placed in the ON state is equal to or higher than the first predetermined temperature T0, and lower than the second predetermined temperature T1, the cooling system performs fixed duty control and abnormality detection processing on the cooling fan 40 immediately after the electric vehicle 90 is placed in the ON state. Then, after the abnormality detection processing is performed, the cooling fan 40 is controlled under variable duty control. When the temperature TB of the main battery 10 detected when the vehicle 90 is placed in the ON state is equal to or higher than the second predetermined temperature T1, the cooling system inhibits the fixed duty control of the cooling fan 40, and performs variable duty control on the cooling fan 40, while monitoring the temperature TB of the main battery 10. If the temperature TB of the main battery 10 is reduced to be lower than the second predetermined temperature T1, the cooling system performs fixed duty control and abnormality detection processing on the cooling fan 40. After the abnormality detection processing is performed, the cooling fan 40 is controlled under variable duty control. Then, if the ignition switch 27 is turned off, so that the ECU is stopped and the vehicle 90 is placed in the OFF state, the cooling system stops operating.

Next, the fixed duty control of the cooling fan 40 in step S104 of FIG. 5 will be described in detail with reference to FIG. 6.

Under the fixed duty control of the cooling fan 40, the command duty D is kept constant at the minimum value D1 in the duty map shown in FIG. 4 only for the predetermined time, when a particular condition is satisfied, such as when the temperature TB of the main battery 10 exceeds the first predetermined temperature T0 for the first time after it rises from a temperature lower than the first predetermined temperature T0. Under the fixed duty control, the command duty D is kept constant at the maximum value D3 on the duty map shown in FIG. 4 only for the predetermined time, when a particular condition is satisfied, such as when the temperature TB of the main battery 10 is higher than the third predetermined temperature T2 (TB>T2). When no particular condition is satisfied, and the temperature TB of the main battery 10 is equal to or lower than the third predetermined temperature T2, the command duty D is kept constant at an intermediate value DM between the maximum value D3 and the minimum value D1 in the duty map shown in FIG. 4 for the predetermined time. With the command duty D thus set to one of the fixed values (D1, D3, DM), the cooling fan 40 is rotated at a fixed rotational speed for the predetermined period. The command duty D set in the case where a particular condition is satisfied, such as when the temperature TB of the main battery 10 exceeds the first predetermined temperature T0 for the first time after it rises from a temperature lower than the first predetermined temperature T0, is not limited to the minimum value D1, but may be a value that is larger than the minimum value D1, provided that the value is smaller than a command value issued under variable duty control corresponding to the temperature TB of the main battery 10. Also, the command duty D set in the case (TB>T2) where the temperature TB of the main battery 10 is higher than the third predetermined temperature T2 is not limited to the maximum value D3, but may be a value that is smaller than the maximum value D3, provided that the value is larger than a command value issued under variable duty control corresponding to the temperature TB of the main battery 10.

The controller 70 determines, in step S201 through step S207 of FIG. 6, whether a particular condition is satisfied. As shown in step S201 of FIG. 6, the controller 70 determines whether the temperature TB of the main battery 10 has exceeded the first predetermined temperature T0 for the first time after rising from a temperature lower than the first predetermined temperature T0. When the controller 70 determines that the condition of step S201 of FIG. 6 is satisfied (YES), it jumps from step S201 to step S211, and keeps the command duty D at the minimum value D1 in the duty map shown in FIG. 4, for the predetermined period. In this manner, the cooling fan 40 is controlled so as to rotate at the fixed target rotational speed (the lowest rotational speed).

If the controller 70 makes a negative decision (NO) in step S201 of FIG. 6, namely, the controller 70 determines in step S201 that one of the particular conditions is not satisfied, it proceeds to step S202 of FIG. 6, to determine whether the next particular condition is satisfied.

The controller 70 calculates input electric power Win delivered to the main battery 10, from the voltage of the main battery 10 detected by the voltage sensor 62 shown in FIG. 1 and the current of the main battery 10 detected by the current sensor 63. When the input power Win delivered to the main battery 10 is smaller than a given threshold value Win_Lo, namely, when the charging power delivered to the main battery 10 is smaller than the given threshold value Win_Lo, as shown in step S202 of FIG. 6, the controller 70 determines that the air quantity of the cooling fan 40 may be small since a temperature rise of the main battery 10 is small, the controller 70 makes an affirmative decision (YES) and jumps to step S211, to set the command duty D to the minimum value D1, as described above. When the input power Win delivered to the main battery 10 is equal to or larger than the given threshold value Win_Lo, the controller 70 makes a negative decision (NO) in step S202, and proceeds to step S203, to determine whether the next particular condition is satisfied.

The controller 70 calculates output electric power Wout generated from the main battery 10, from the voltage of the main battery 10 detected by the voltage sensor 62, and the current of the main battery 10 detected by the current sensor 63, as in step S202 of FIG. 6. When the output power Wout generated from the main battery 10 is smaller than a given threshold value Wout_Lo, namely, when the output power of the main battery 10 is smaller than the given threshold value Wout_Lo, as shown in step S203 of FIG. 6, the controller 70 determines that the air quantity of the cooling fan 40 may be small since a temperature rise of the main battery 10 is small, makes an affirmative decision (YES) and then jumps to step S211, to set the command duty D to the minimum value D1, in the same manner as described above. When the output power Wout generated from the main battery 10 is equal to or larger than the given threshold value Wout_Lo, the controller 70 makes a negative decision (NO) in step S203, and proceeds to step S204, to determine whether the next particular condition is satisfied.

When the vehicle speed Vel is lower than a given threshold value Vel_Lo, namely, when the vehicle speed Vel of the electric vehicle 90 is slower than the given threshold value Vel_Lo, as shown in step S204 of FIG. 6, the controller 70 determines that the air quantity of the cooling fan 40 may be small since a temperature rise of the main battery 10 is small, makes an affirmative decision (YES) and then jumps to step S211, to set the command duty D to the minimum value D1, in the same manner as described above. Also, when the vehicle speed Vel is equal to or higher than the given threshold value Vel_Lo, the controller 70 makes a negative decision (NO) in step S204, and proceeds to step S205, to determine whether the next particular condition is satisfied.

When the accelerator operation amount Acc is smaller than a given threshold value Acc_Lo, namely, when the operation amount of the accelerator pedal 28 is small, and the required driving force of the electric vehicle 90 is small, as shown in step S205 of FIG. 6, the controller 70 determines that the air quantity of the cooling fan 40 may be small since a temperature rise of the main battery 10 is small, makes an affirmative decision (YES) and then jumps to step S211, to set the command duty D to the minimum value D1, in the same manner as described above. Also, when the accelerator operation amount Acc is equal to or larger than the given threshold value Acc_Lo, the controller 70 makes a negative decision (NO) in step S205, and proceeds to step S206, to determine whether the next particular condition is satisfied. The temperature rise of the main battery 10 may also be reduced when the depression amount of the brake pedal 29 is small, and the regenerative electric power of the electric vehicle 90 is small; therefore, the controller 70 determines that the air quantity of the cooling fan 40 may be small, and jumps to step S211, to set the command duty D to the minimum value D1.

When a signal indicative of the ON/OFF state of the engine 20 received from another control unit is an engine 20 ON signal, the controller 70 determines in step S206 of FIG. 6 that the engine 20 is ON, i.e., an affirmative decision (YES), and sets the command duty D to the minimum value D1, in the same manner as described above. When the engine 20 is ON, and the required power of the electric vehicle 90 is increased, necessary power is generated from the engine 20, and the output electric power of the main battery 10 does not become so large; therefore, a temperature rise of the main battery 10 is small, and the air quantity of the cooling fan 40 may be small. Thus, if the controller 70 determines in step S206 that the engine 20 is ON, it jumps to step S211, and sets the command duty D to the minimum value D1, in the same manner as described above. When the signal indicative of the ON/OFF state of the engine 20 received from another control unit is an engine 20 OFF signal, the controller 70 makes a negative decision (NO) in step S206, and proceeds to step S207, to determine whether the next particular condition is satisfied.

The controller 70 obtains data of inclination Inc in the traveling route of the electric vehicle 90, from the navigation system 30 installed on the electric vehicle 90. When the inclination Inc in the traveling route is smaller than a given threshold value Inc_LO, the controller 70 determines that the possibility of increase of the required output due to a steep uphill or increase of regenerative electric power due to a steep downhill is small, makes an affirmative decision (YES) and then jumps to step S211, to set the command duty D to the minimum value D1, in the same manner as described above. On the other hand, when the inclination Inc in the traveling route is equal to or larger than the given threshold value Inc_LO, the controller 70 determines that there is a possibility of increase of the required output due to a steep uphill or increase of regenerative electric power due to a steep downhill, and proceeds to the next step S208 without jumping to step S211.

As explained above, in steps S201 through S207 shown in FIG. 6, the controller 70 determines whether any of the following conditions are satisfied (1) the temperature TB of the main battery 10 exceeds the first predetermined temperature T0 for the first time after rising from a temperature lower than T0, (2) the input/output power of the main battery 10 is small, (3) the vehicle speed Vel, accelerator operation amount Acc, and the inclination in the traveling route are small, and the input/output power of the main battery 10 is small, and (4) the engine 20 is ON, and the input/output power of the main battery 10 is small. If any one of these conditions is satisfied, the controller 70 makes an affirmative decision (YES) and jumps to step S211, and keeps the command duty D at the minimum value D1 for the predetermined period. In this manner, it is possible to suppress electric power consumption caused by driving of the cooling fan 40, without making the user uncomfortable due to noise.

When the controller 70 determines that none of the above-described conditions is satisfied in steps S201 through S207, it proceeds to step S208 of FIG. 6, and determines whether the temperature TB of the main battery 10 is higher than the third predetermined temperature T2. The third predetermined temperature T2 is equal to or higher than the first predetermined temperature T0, and is lower than the second predetermined temperature T1 at which the fixed duty control of the cooling fan 40 is inhibited. While the second predetermined temperature T1 is variable, it may be 40° C., for example. When T0 is equal to 36° C., the third predetermined temperature T2 is equal to or higher than 36° C. and is lower than 40° C., and may be set to 38° C., for example.

When the temperature TB of the main battery 10 exceeds the third predetermined temperature T2, for example, when the temperature TB of the main battery 10 is 39° C., which is equal to or higher than the first predetermined temperature T0 (36° C.) and lower than the second predetermined temperature T1 (40° C.), and exceeds the third predetermined temperature T2 (38° C.), the controller 70 makes an affirmative decision (YES) in step S208 of FIG. 6, and proceeds to step S209 of FIG. 6. In step S209, the controller 70 keeps the command duty D constant at the maximum value D3 shown in the duty map of FIG. 4. As a result, the cooling fan 40 is controlled so as to rotate at a fixed target rotational speed (the highest rotational speed). Thus, when the temperature TB of the main battery 10 is high, the cooling fan 40 is driven at the highest rotational speed, so as to effectively cool the secondary battery, and curb deterioration of the secondary battery.

When the temperature TB of the main battery 10 is equal to or lower than the third predetermined temperature T2, for example, when the temperature TB of the main battery 10 is 37° C., which is equal to or higher than the first predetermined temperature T0 (36° C.) and lower than the second predetermined temperature T1 (40° C.), and is equal to or lower than the third predetermined temperature T2 (38° C.), the controller 70 makes a negative decision (NO) in step S208 of FIG. 6, and proceeds to step S210 of FIG. 6. In step S210, the controller 70 keeps the command duty D constant at the intermediate value DM between the maximum value D3 and the minimum value D1 shown in the duty map of FIG. 4. As a result, the cooling fan 40 is controlled so as to be rotated at a fixed target rotational speed (an intermediate rotational speed). Thus, when the temperature TB of the main battery 10 is not high enough to exceed the third predetermined temperature T2, the cooling fan 40 is driven at the intermediate rotational speed, thus making it possible to cool the secondary battery, while curbing electric power consumption caused by driving of the cooling fan 40.

After the controller 70 drives the cooling fan 40 under fixed duty control in one of steps S209, S210, S211 shown in FIG. 6, it finishes the routine of fixed duty control shown in FIG. 6.

While the basic operation of the cooling system for the vehicle-mounted secondary battery and the abnormality detection processing have been described above, other examples of operation of the cooling system for the vehicle-mounted secondary battery, when the temperature TB of the main battery 10, detected when the electric vehicle 90 is placed in the ON state, assumes various values will be described with reference to FIG. 7A through FIG. 10B.

Figure 7A:
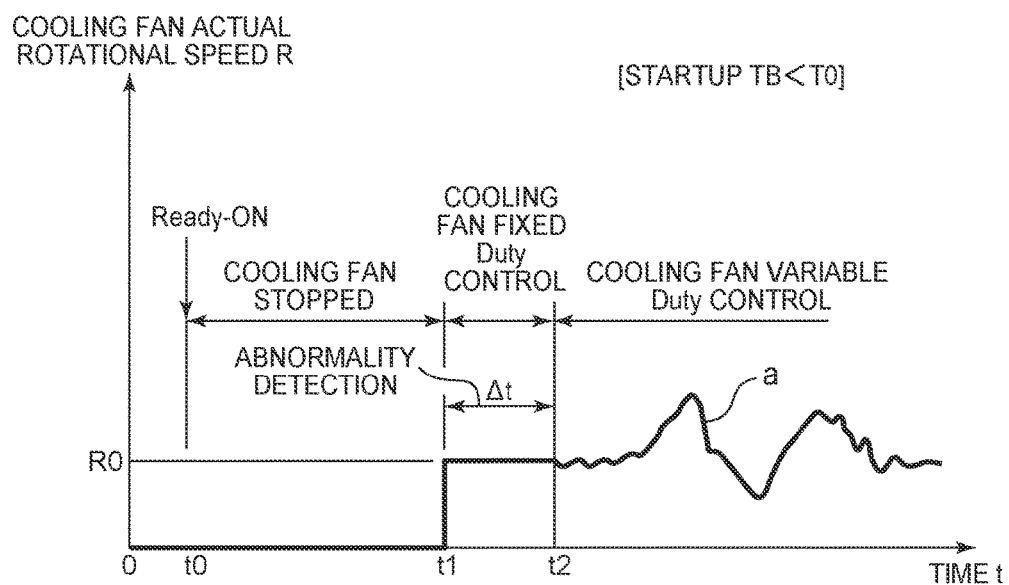
FIG. 7A is a time chart showing changes in the rotational speed of the cooling fan of FIG. 3 when the temperature of a main battery at the time of startup is lower than a first predetermined temperature T0.
Figure 7B:
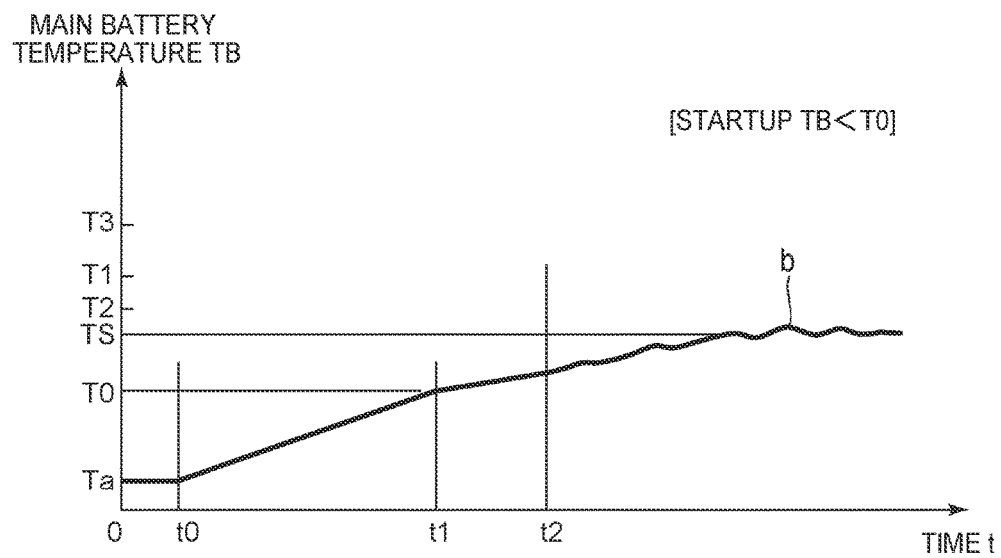
FIG. 7B is a time chart showing changes in the temperature of the main battery of FIG. 7A when the temperature of the main battery at the time of startup, is lower than the first predetermined temperature T0.

Referring to FIG. 7A and FIG. 7B, the operation of the cooling system for the vehicle-mounted secondary battery, when the temperature TB of the main battery 10 detected, when the vehicle 90 is placed in the ON state, is lower than the first predetermined temperature T0 will be described. At time t0 of FIG. 7A and FIG. 7B, the ignition switch 27 is turned on, and the ECU is started, so that the electric vehicle 90 is placed in the ON state. Immediately before time t0, the ignition switch 27 is in an OFF state, and the ECU, electric vehicle 90, and the cooling fan 40 are stopped, during which, the rotational speed of the cooling fan 40 is equal to zero. Also, immediately before time t0, the temperature TB of the main battery 10 is equal to temperature Ta that is lower than the first predetermined temperature T0. Solid line a shown in FIG. 7A indicates changes in the rotational speed R of the cooling fan 40 with time t, and solid line b shown in FIG. 7B indicates changes in the temperature TB of the main battery 10 with time t.

At time t0 at which the electric vehicle 90 is placed in the ON state, the controller 70 causes the temperature sensor 61 to detect the temperature TB of the main battery 10, as shown in step S101 of FIG. 5, and compares the temperature TB with the first predetermined temperature T0. In the case of FIG. 7A and FIG. 7B, the temperature TB of the main battery 10 is equal to temperature Ta that is lower than the first predetermined temperature T0; therefore, the controller 70 makes an affirmative decision (YES) in step S101 of FIG. 5, and proceeds to steps S102, S103 of FIG. 5, to detect the temperature TB of the main battery 10, and wait until the temperature TB of the main battery 10 becomes equal to or higher than the first predetermined temperature T0. If the ignition switch 27 is turned on at time t0, the electric vehicle 90 is placed in the ON state in which the vehicle 90 is able to travel. If the electric vehicle 90 starts traveling from time t0, the main battery 10 discharges electric power to be supplied to the second motor-generator 18, and is charged with electric power generated by the first motor-generator 16, whereby its temperature TB gradually rises, as indicated by solid line b shown in FIG. 7B. If the temperature TB of the main battery 10 rises up to the first predetermined temperature T0, so that TB=T0, at time t1 shown in FIG. 7B, the controller 70 makes an affirmative decision (YES) in step S103 of FIG. 5, and proceeds to step S104, to perform the routine of fixed duty control shown in FIG. 6.

In the case shown in FIG. 7B, the temperature TB of the main battery 10 detected at time t0 is Ta that is lower than the first predetermined temperature T0, and the temperature TB then rises up to the first predetermined temperature T0 from time t0 to time t1 of FIG. 7B; therefore, the controller 70 makes an affirmative decision (YES) in step S201 of FIG. 6, and jumps to step S211, to keep the command duty D constant at the minimum value D1, for a predetermined period Δt shown in FIG. 7A. As shown in FIG. 7A, the cooling fan 40 is controlled to be rotated at the rotational speed R0 (the minimum rotational speed) for the predetermined time Δt. Once the cooling fan 40 is subjected to fixed duty control, the controller 70 finishes the routine of fixed duty control shown in FIG. 6, and returns to step S105 of FIG. 5. In step S105, the controller 70 performs abnormality detection processing for detecting the presence or absence of an abnormality in the cooling fan 40, based on a difference between the actual rotational speed of the cooling fan 40 and the target rotational speed based on the command duty D, during the predetermined period Δt.

If the fixed duty control and abnormality detection processing of the cooling fan 40 are completed at time t2 of FIG. 7A and FIG. 7B, the controller 70 proceeds to step S106 of FIG. 5, to control the cooling fan 40 under variable duty control based on the duty map of FIG. 4, and finishes the operation of the program. As a result, as shown in FIG. 7A, the rotational speed of the cooling fan 40 undergoes various changes, depending on the temperature TB of the main battery 10, etc. Meanwhile, the temperature TB of the main battery 10 is controlled to the vicinity of the normal operating temperature TS.

Figure 8A:
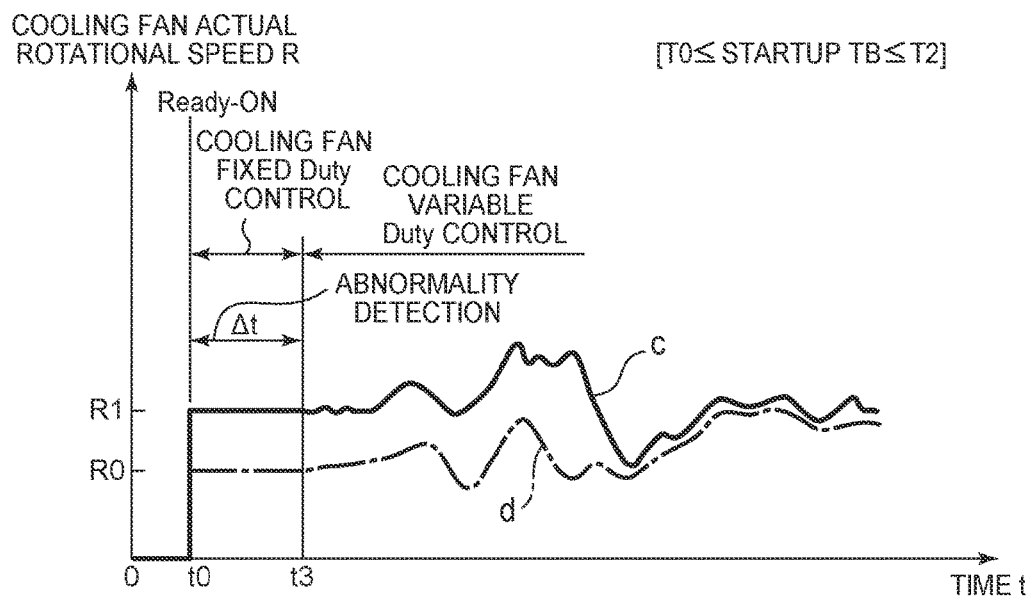
FIG. 8A is a time chart showing changes in the rotational speed of the cooling fan of FIG. 3 when the temperature of the main battery of FIG. 7A at the time of startup, is equal to or higher than the first predetermined temperature T0, and is equal to or lower than a third predetermined temperature T2.
Figure 8B:
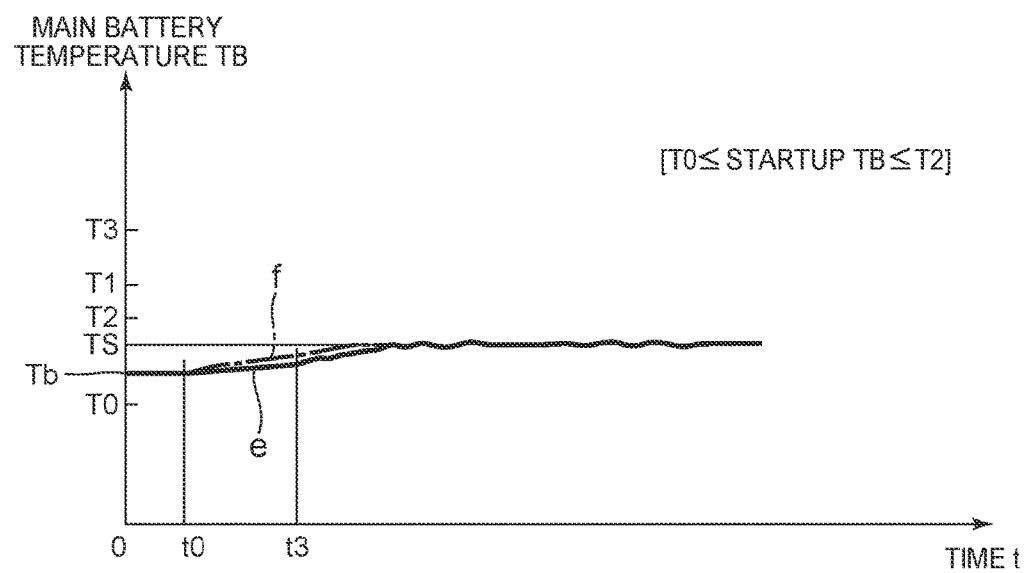
FIG. 8B is a time chart showing changes in the temperature of the main battery of FIG. 7A when the temperature of the main battery at the time of startup, is equal to or higher than the first predetermined temperature T0, and is equal to or lower than the third predetermined temperature T2.

Next, the operation of the cooling system for the vehicle-mounted secondary battery, in the case where the temperature TB of the main battery 10, detected when the electric vehicle 90 is placed in the ON state, is equal to or higher than the first predetermined temperature T0, and is equal to or lower than the third predetermined temperature T2, will be described with reference to FIG. 8A and FIG. 8B. At time t0 of FIG. 8A and FIG. 8B, the ignition switch 27 is turned on, and the electric vehicle 90 is placed in the ON state, as is the case in FIGS. 7A, 7B. As shown in FIG. 8B, immediately before time t0, the temperature TB of the main battery 10 is a temperature Tb that is equal to or higher than the first predetermined temperature T0 and is equal to or lower than the third predetermined temperature T2. The third predetermined temperature T2 is lower than the second predetermined temperature T1, and FIG. 8B shows the case where T0<TB<T2<T1. Solid line c shown in FIG. 8A indicates changes in the rotational speed R of the cooling fan 40 with time t when none of the particular conditions is satisfied in the routine of fixed duty control as explained above with reference to FIG. 6 (when negative decisions (NO) are made in all of steps S201 to S207), and one-dot chain line d indicates changes in the rotational speed R of the cooling fan 40 with time t when any one of the particular conditions is satisfied. Solid line e shown in FIG. 8B indicates changes in the temperature TB of the main battery 10 with time t when none of the particular conditions is satisfied, and one-dot chain line f shown in FIG. 8B indicates changes in the temperature TB of the main battery 10 with time t when any one of the particular conditions is satisfied.

Once the electric vehicle 90 is placed in the ON state at time t0, the controller 70 causes the temperature sensor 61 to detect the temperature TB of the main battery 10, as shown in step S101 of FIG. 5, and compares the temperature TB with the first predetermined temperature T0. In the case of FIG. 8A and FIG. 8B, the temperature TB of the main battery 10 is equal to the temperature Tb between the first predetermined temperature T0 and the third predetermined temperature T2; therefore, the controller 70 makes a negative decision (NO) in step S101 of FIG. 5, and proceeds to step S107 of FIG. 5. Since the temperature TB is lower than the second predetermined temperature T1, as shown in FIG.

8B, the controller 70 makes an affirmative decision (YES) in step S107 of FIG. 5, and proceeds to step S104 of FIG. 5, to perform the routine of fixed duty control shown in FIG. 6.

The controller 70 performs fixed duty control on the cooling fan 40, according to the flowchart of the fixed duty control shown in FIG. 6. In the case shown in FIG. 8A and FIG. 8B, the initial temperature TB of the main battery 10 is higher than the first predetermined temperature T0, and the temperature TB of the main battery 10 does not exceed the first predetermined temperature T0 for the first time after rising from a temperature lower than the first predetermined temperature T0. Accordingly, the controller 70 makes a negative decision (NO) in step S201 of FIG. 6, and makes an affirmative or negative decision (YES or NO) in steps S202 to S207 of FIG. 6. Then, if any one of the particular conditions that the vehicle speed Vel, accelerator operation amount Acc, or the inclination in the traveling route is small (steps S204, S205, S207), or the engine 20 is ON (in operation) (step S206), is satisfied, the controller 70 makes an affirmative decision (YES) in the corresponding one of steps S202 to S207, and jumps to step S211, to perform fixed duty control on the cooling fan 40 while keeping the command duty D constant at the minimum value D1, for the predetermined period Δt. At this time, as in the case of FIGS. 7A, 7B, the cooling fan 40 is driven at the rotational speed R0 as the minimum rotational speed, as indicated by one-dot chain line d of FIG. 8A. In the meantime, the temperature TB of the main battery 10 gradually rises, as indicated by one-dot chain line f of FIG. 8B. With the cooling fan 40 thus subjected to fixed duty control, the controller 70 finishes the routine of fixed duty control shown in FIG. 6, and returns to step S105 of FIG. 5, to perform abnormality detection processing for detecting the presence or absence of an abnormality in the cooling fan 40, based on a difference between the actual rotational speed of the cooling fan 40 and the target rotational speed based on the command duty D, during the predetermined period Δt.

When the fixed duty control and the abnormality detection processing are completed at time t3 at which the predetermined period Δt expires, the controller 70 proceeds to step S106 of FIG. 5, to control the cooling fan 40 under variable duty control based on the duty map of FIG. 4, and finish the operation of the program. After time t3, the rotational speed of the cooling fan 40 undergoes various changes, depending on the temperature TB of the main battery 10, etc., as indicated by one-dot chain line d of FIG. 8A. Also, as indicated by one-dot chain line f of FIG. 8B, the temperature TB of the main battery 10 is controlled to the vicinity of the normal operating temperature TS after time t3.

If, on the other hand, a negative decision (NO) is made in all of steps S202 to S207 of FIG. 6, the controller 70 proceeds to step S208 of FIG. 6, and determines whether the temperature TB of the main battery 10 is equal to or higher than the third predetermined temperature T2. Since the temperature TB of the main battery 10 detected when the vehicle 90 is placed in the ON state is equal to Tb that is lower than the third predetermined temperature T2, as shown in FIG. 8B, the controller 70 makes a negative decision (NO) in step S208 of FIG. 6, and jumps to step S210 of FIG. 6, to perform fixed duty control on the cooling fan 40 while keeping the command duty constant at the intermediate value DM between the minimum value D1 and the maximum value D3. At this time, the cooling fan 40 is driven at a rotational speed R1 that is higher than the rotational speed R0 as the minimum rotational speed and lower than the rotational speed R3 as the maximum rotational speed, as indicated by solid line c of FIG. 8A. During this period, the temperature TB of the main battery 10 gradually rises, as indicated by solid line e of FIG. 8B. Since the rotational speed R of the cooling fan 40 is equal to the rotational speed R1 that is higher than the minimum rotational speed R0, the temperature TB of the main battery 10 rises at a lower rate than that in the case where the rotational speed R is equal to R0. With the cooling fan 40 thus subjected to fixed duty control, the controller 70 finishes the routine of fixed duty control shown in FIG. 6, and returns to step S105 of FIG. 5, to perform abnormality detection processing for detecting the presence or absence of an abnormality in the cooling fan 40, based on a difference between the actual rotational speed of the cooling fan 40 and the target rotational speed based on the command duty D, during the predetermined period Δt.

When the fixed duty control and the abnormality detection processing are completed at time t3 at which the predetermined period Δt expires, the controller 70 proceeds to step S106 of FIG. 5, to control the cooling fan 40 under variable duty control based on the duty map of FIG. 4, and finishes the operation of the program, in the same manner as described above. After time t3, the rotational speed of the cooling fan 40 undergoes various changes, depending on the temperature TB of the main battery 10, etc., as indicated by solid line c of FIG. 8A. After time t3, the temperature TB of the main battery 10 is controlled to the vicinity of the normal operating temperature TS, as indicated by solid line e of FIG. 8B.

Figure 9A:
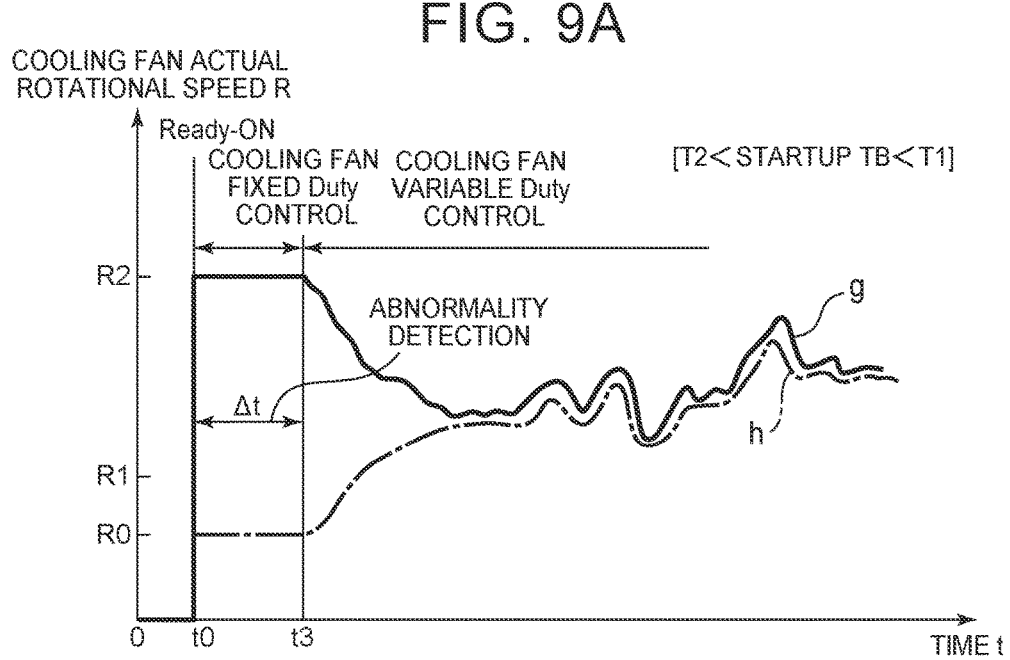
FIG. 9A is a time chart showing changes in the rotational speed of the cooling fan of FIG. 3 when the temperature of the main battery of FIG. 7A at the time of startup, is higher than the third predetermined temperature T2, and is lower than a second predetermined temperature T1.
Figure 9B:
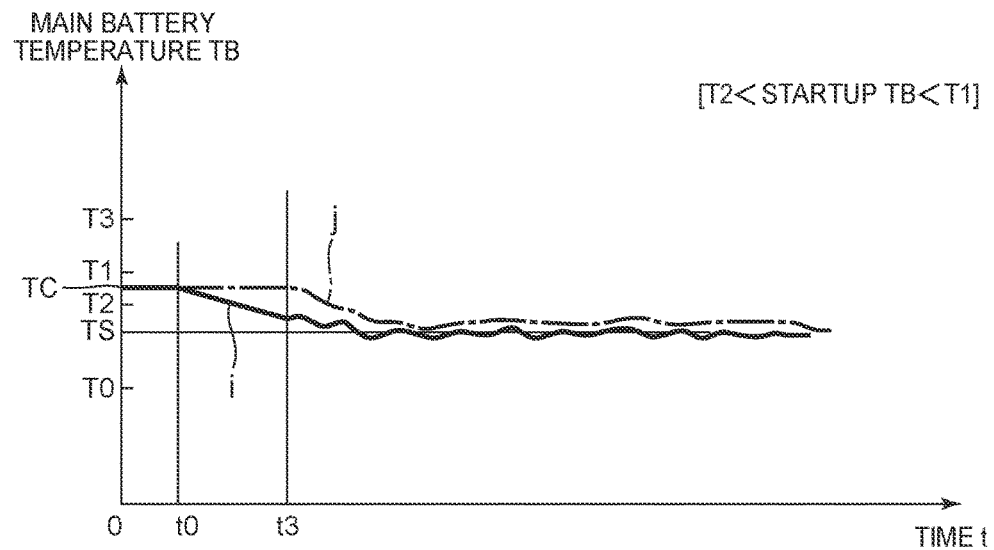
FIG. 9B is a time chart showing changes in the temperature of the main battery of FIG. 7A when the temperature of the main battery at the time of startup, is higher than the third predetermined temperature T2, and is lower than the second predetermined temperature T1.

Referring next to FIG. 9A and FIG. 9B, the operation of the cooling system for the vehicle-mounted secondary battery in the case, where the temperature TB of the main battery 10, detected when the vehicle 90 is placed in the ON state, exceeds the third predetermined temperature T2, and is lower than the second predetermined temperature T1, will be described. At time t0 of FIG. 9A and FIG. 9B, the ignition switch 27 is turned on, and the ECU is started, so that the electric vehicle 90 is placed in the ON state, as is the case in FIG. 7A and FIG. 7B. As shown in FIG. 9B, immediately before time t0, the temperature TB of the main battery 10 is equal to a temperature TC that is higher than the third predetermined temperature T2, and is lower than the second predetermined temperature T1. FIG. 9B shows the case where T2<TB<T1. Solid line g shown in FIG. 9A indicates changes of the rotational speed R of the cooling fan 40 with time t when none of the particular conditions is satisfied in the routine of fixed duty control as explained above with reference to FIG. 6 (when negative decisions (NO) are made in all of steps S201 to S207), and one-dot chain line h indicates changes of the rotational speed R of the cooling fan 40 with time t when any one of the particular conditions is satisfied. Also, solid line i shown in FIG. 9B indicates changes of the temperature TB of the main battery 10 with time t when none of the particular conditions is satisfied, and one-dot chain line j shown in FIG. 9B indicates changes of the temperature TB of the main battery 10 with time t when one of the particular conditions is satisfied.

Once the electric vehicle 90 is placed in the ON state at time t0, the controller 70 causes the temperature sensor 61 to detect the temperature TB of the main battery 10, and compares the temperature TB with the first predetermined temperature T0. In the case of FIG. 9A and FIG. 9B, the temperature TB of the main battery 10 is equal to the temperature TC that is higher than the first predetermined temperature T0, and is between the third predetermined temperature T2 and the second predetermined temperature T1; therefore, the controller 70 makes a negative decision (NO) in step S101 of FIG. 5, and makes an affirmative decision (YES) in step S107 of FIG. 5. Then, the controller 70 proceeds to step S104, to perform the routine of fixed duty control shown in FIG. 6.

The controller 70 performs fixed duty control on the cooling fan 40 according to the flowchart of the fixed duty control shown in FIG. 6. In the case shown in FIG. 9A and FIG. 9B, the initial temperature TB of the main battery 10 is higher than the first predetermined temperature T0, and the temperature TB of the main battery 10 does not exceed the first predetermined temperature T0 for the first time after rising from a temperature that is lower than the first predetermined temperature T0, as in the case of FIG. 8A and FIG. 8B. Accordingly, the controller 70 makes a negative decision (NO) in step S201 of FIG. 6, and makes affirmative or negative decisions (YES or NO) in steps S202 to S207 of FIG. 6. Then, as in the case of FIG. 8A and FIG. 8B, if an affirmative decision (YES) is made in any one of steps S202 to S207, the controller 70 jumps to step S211, to perform fixed duty control on the cooling fan 40 by keeping the command duty D at the minimum value D1, for the predetermined period Δt. At this time, as in the case of FIG. 8A, the cooling fan 40 is driven at the rotational speed R0 as the minimum rotational speed as indicated by one-dot chain line h of FIG. 9A. During this period, the temperature TB of the main battery 10 hardly changes, or rises slightly, as indicated by one-dot chain line j of FIG. 9B. Once the cooling fan 40 is subjected to fixed duty control, the controller 70 finishes the routine of fixed duty control shown in FIG. 6, and returns to step S105 of FIG. 5, to perform abnormality detection processing for detecting the presence or absence of an abnormality in the cooling fan 40 based on a difference between the actual rotational speed of the cooling fan 40 and the target rotational speed based on the command duty D during the predetermined period Δt.

Then, if the fixed duty control and the abnormality detection processing are completed at time t3 at which the predetermined period Δt expires, the controller 70 proceeds to step S106 of FIG. 5, to control the cooling fan 40 under variable duty control based on the duty map of FIG. 4, and finishes the operation of the program. At time t3, the temperature TB of the main battery 10 is around the temperature TC that is higher than the normal operating temperature TS; therefore, the rotational speed of the cooling fan 40 rises after time t3, as indicated by one-dot chain line h of FIG. 9A. Also, since the rotational speed R of the cooling fan 40 increases after time t3, the temperature TB of the main battery 10 is reduced toward the normal operating temperature TS, and is then controlled to be around the normal operating temperature TS, as indicated by one-dot chain line j of FIG. 9B.

On the other hand, when negative decisions (NO) are made in all of steps S202 to S207 of FIG. 6, the controller 70 proceeds to step S208 of FIG. 6, and determines whether the temperature TB of the main battery 10 is equal to or higher than the third predetermined temperature T2. Since the temperature TB of the main battery 10 detected when the vehicle 90 is placed in the ON state is equal to TC that is higher than the third predetermined temperature T2, as shown in FIG. 9B, the controller 70 makes an affirmative decision (YES) in step S208 of FIG. 6, and proceeds to step S209 of FIG. 6, to perform fixed duty control of the cooling fan 40 by keeping the command duty constant at the maximum value D3. At this time, the cooling fan 40 is driven at the rotational speed R2 as the maximum rotational speed, as indicated by solid line g of FIG. 9A. If the cooling fan 40 is driven at the rotational speed R2 as the maximum rotational speed, the air quantity of the cooling fan 40 is also increased; therefore, the temperature TB of the main battery 10 is reduced from the temperature TC, as indicated by solid line i of FIG. 9B. Thus, when the temperature TB of the main battery 10 is high, the cooling fan 40 is driven at the highest rotational speed, so as to effectively cool the secondary battery, and curb deterioration of the secondary battery. Once the cooling fan 40 is subjected to fixed duty control, the controller 70 finishes the routine of fixed duty control shown in FIG. 6, and returns to step S105 of FIG. 5, to perform abnormality detection processing for detecting the presence or absence of an abnormality in the cooling fan 40 based on a difference between the actual rotational speed of the cooling fan 40 and the target rotational speed based on the command duty D during the predetermined period Δt.

Then, when the fixed duty control and the abnormality detection processing are completed at time t3 at which the predetermined period Δt expires, the controller 70 proceeds to step S106 of FIG. 5, to control the cooling fan 40 under variable duty control based on the duty map of FIG. 4, and finish the operation of the program, in the same manner as described above. After time t3, the rotational speed of the cooling fan 40 undergoes various changes, depending on the temperature TB of the main battery 10, etc., as indicated by solid line g of FIG. 9A, and the temperature TB of the main battery 10 is controlled to be around the normal operating temperature TS after time t3, as indicated by solid line i of FIG. 9B.

Figure 10A:
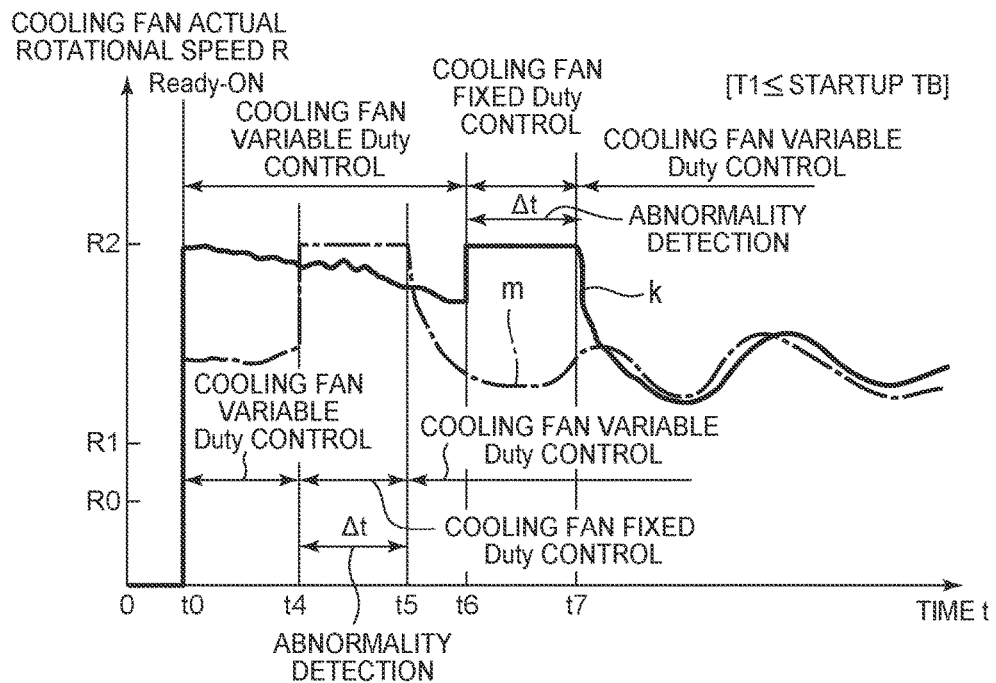
FIG. 10A is a time chart showing changes in the rotational speed of the cooling fan of FIG. 3 when the temperature of the main battery of FIG. 7A at the time of startup, is equal to or higher than the second predetermined temperature T1.

Next, the operation of the cooling system for the vehicle-mounted secondary battery, in the case where the temperature TB of the main battery 10, detected when the electric vehicle 90 is placed in the ON state, is equal to a temperature Td that is equal to or higher than the second predetermined temperature T1 and lower than the fourth predetermined temperature T3 will be described, with reference to one-dot chain line m of FIG. 10A and one-dot chain line o of FIG. 10B. At time t0 of FIG. 10A and FIG. 10B, the ignition switch 27 is turned ON, and the electric vehicle 90 is placed in the ON state, as is the case in FIG. 7A and FIG. 7B.

Once the electric vehicle 90 is placed in the ON state at time t0, the controller 70 causes the temperature sensor 61 to detect the temperature TB of the main battery 10, and compares the temperature TB with the first predetermined temperature T0, as indicated in step S101 of FIG. 5. Since the current temperature TB of the main battery 10 is equal to Td that is equal to or higher than the second predetermined temperature T1 and lower than the fourth predetermined temperature T3, the controller 70 makes negative decisions (NO) in steps S101, S107 of FIG. 5, and makes an affirmative decision (YES) in step S108 of FIG. 5. Then, the controller 70 proceeds to step S109 of FIG. 5 to perform variable duty control on the cooling fan 40 within the region A of the duty map shown in FIG. 4. Since the temperature TB of the main battery 10 is higher than the normal operating temperature TS, the controller 70 sets the command duty D to a large value so as to lower the temperature TB of the main battery 10 down to the normal operating temperature TS. As a result, the rotational speed of the cooling fan 40 becomes a relatively high rotational speed, and the air quantity becomes large, so that the temperature TB of the main battery 10 is reduced toward the normal operating temperature TS after time t0. During this period, the controller 70 repeats steps S101 to S109 of FIG. 5, and performs variable duty control on the cooling fan 40 while monitoring the temperature TB of the main battery 10.

Figure 10B:
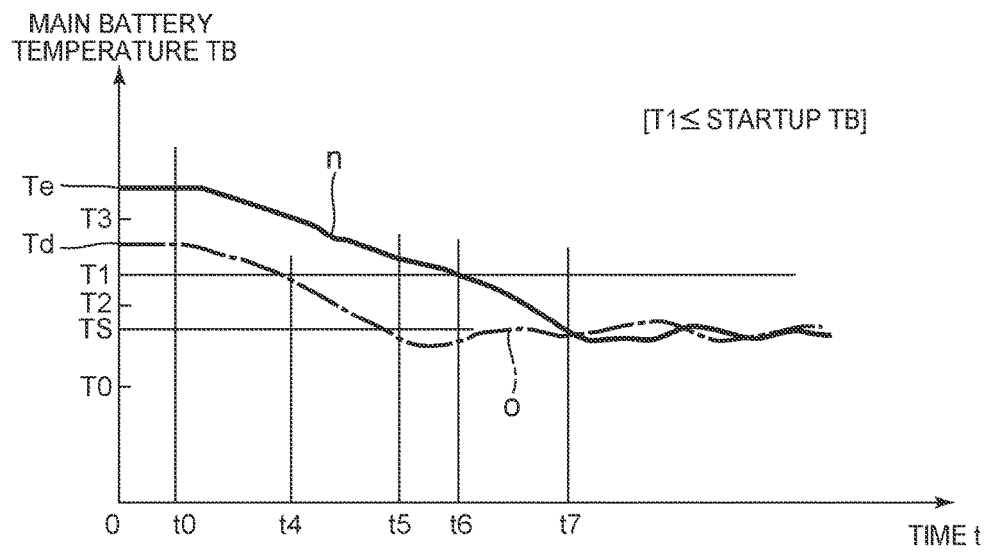
FIG. 10B is a time chart showing changes in the temperature of the main battery of FIG. 7A when the temperature of the main battery at the time of startup is equal to or higher than the second predetermined temperature T1.

If the temperature TB of the main battery 10 is reduced to be lower than the second predetermined temperature T1 at time t4 of FIG. 10B, the controller 70 makes an affirmative decision (YES) in step S107 of FIG. 5, and jumps to step S104 of FIG. 5 to perform fixed duty control on the cooling fan 40.

The controller 70 performs fixed duty control on the cooling fan 40 according to the flowchart of the fixed duty control shown in FIG. 6. As explained above, when negative decisions (NO) are made at each of steps S202 to S207 of FIG. 6, the controller 70 proceeds to step S208 of FIG. 6, to determine whether the temperature TB of the main battery 10 is equal to or higher than the third predetermined temperature T2. As indicated by one-dot chain line o of FIG. 10B, the temperature TB of the main battery 10 has just been reduced from a level higher than the second predetermined temperature T1 down to a level lower than the second predetermined temperature T1, but is still higher than the third predetermined temperature T2. Accordingly, the controller 70 makes an affirmative decision (YES) in step S208, and proceeds to step S209 of FIG. 6, to perform fixed duty control on the cooling fan 40 while keeping the command duty constant at the maximum value D3. At this time, the rotational speed of the cooling fan 40 rapidly increases to the rotational speed R2 as the maximum rotational speed, as indicated by one-dot chain line m of FIG. 10A. Since the cooling fan 40 is driven at the rotational speed R2 as the maximum rotational speed, and the air quantity is large, the temperature TB of the main battery 10 is reduced from the second predetermined temperature T1 as indicated by one-dot chain line o of FIG. 10B, during this period. With the cooling fan 40 thus subjected to fixed duty control, the controller 70 finishes the routine of fixed duty control shown in FIG. 6, and returns to step S105 of FIG. 5, to perform abnormality detection processing for detecting the presence or absence of an abnormality in the cooling fan 40 based on a difference between the actual rotational speed of the cooling fan 40 and the target rotational speed based on the command duty D during the predetermined period Δt.

Then, if the fixed duty control and the abnormality detection processing are completed at time t5 at which the predetermined period Δt expires, the controller 70 proceeds to step S106 of FIG. 5, to control the cooling fan 40 under variable duty control based on the duty map of FIG. 4, and finishes the operation of the program, in the same manner as described above. Since the temperature TB of the main battery 10 has been reduced to be lower than the normal operating temperature TS at time t5, the rotational speed R of the cooling fan 40 is reduced after time t5, and then changes depending on conditions, such as the temperature TB of the main battery 10, as indicated by one-dot chain line m of FIG. 10A. On the other hand, the temperature TB of the main battery 10 is reduced to be lower than the normal operating temperature TS at time t5, but is then increased and controlled to be around the normal operating temperature TS.

If, on the other hand, an affirmative decision (YES) is made in any one of steps S202 to S207, the controller 70 jumps to step S211, and performs fixed duty control on the cooling fan 40 by keeping the command duty D at the minimum value D1 for the predetermined period Δt, as explained above with reference to FIG. 8A and FIG. 8B. Then, the controller 70 finishes the routine of fixed duty control shown in FIG. 6, and returns to step S105 of FIG. 5, to perform abnormality detection processing on the cooling fan 40. Then, the controller 70 controls the cooling fan 40 under variable duty control based on the duty map of FIG. 4, and finishes the program, as indicated in step S106 of FIG. 5.

Next, the operation of the cooling system for the vehicle-mounted secondary battery, in the case where the temperature TB of the main battery 10, detected when the vehicle 90 is placed in the ON state, is equal to a temperature Te that is equal to or higher than the fourth predetermined temperature T3 will be described, with reference to solid line k of FIG. 10A and solid line n of FIG. 10B. The operation of this case is similar to the operation explained above with reference to one-dot chain line m of FIG. 10A and one-dot chain line o of FIG. 10B, except that, after time t0, the cooling fan 40 is operated under variable duty control within the region B of the duty map shown in FIG. 4, that the temperature TB of the main battery 10 is reduced to be lower than the second predetermined temperature T1 at time t6 shown in FIG. 10A and FIG. 10B, and that the fixed duty control and abnormality detection processing of the cooling fan 40 are completed at time t7.

In the above description, the temperature TB of the main battery 10 is supposed to be reduced to be lower than the second predetermined temperature T1 while the cooling fan 40 is operated under variable duty control. However, if the temperature TB of the main battery 10 is not reduced to be lower than the second predetermined temperature T1 during the variable duty control, the controller 70 repeatedly executes steps S101, and S107 to S110 of FIG. 5, without performing fixed duty control and abnormality detection processing on the cooling fan 40. Then, if the ignition switch 27 is turned off, the ECU is stopped, the electric vehicle 90 is placed in the OFF state, and the controller 70 stops operation of the flowchart shown in FIG. 5.

When the temperature TB of the main battery 10 detected when the electric vehicle 90 is placed in the ON state is equal to or higher than the second predetermined temperature T1, the cooling system for the vehicle-mounted secondary battery of the illustrated embodiment inhibits fixed duty control of the cooling fan 40. Therefore, when the second predetermined temperature T1 is low, a temperature range in which fixed duty control of the cooling fan 40 is inhibited is expanded, and the chances of execution of the abnormality detection processing are reduced. Conversely, if the second predetermined temperature T1 is elevated, the temperature range in which the fixed duty control is inhibited is narrowed, and the chances of execution of the abnormality detection processing are increased. On the other hand, when the abnormality detection processing of the cooling fan 40 is performed, fixed duty control needs to be performed under which the command duty D is kept constant and the rotational speed of the cooling fan 40 is kept constant. Therefore, during the abnormality detection processing in which the temperature TB of the main battery 10 cannot be controlled, the temperature TB of the main battery 10 may rise, and deterioration of the main battery 10 may progress. The progression of the deterioration due to the temperature rise is greater as the degree of deterioration of the main battery 10 increases, and almost no progression of deterioration appears when the main battery 10 is new, and is hardly deteriorated.

Thus, when the main battery 10 is new, or when the degree of deterioration of the main battery is small, the second predetermined temperature T1 may be set to a higher level as compared with the case where the degree of deterioration of the main battery 10 is large. In this manner, it is possible to increase the chances of fixed duty control and abnormality detection processing of the cooling fan 40 without significantly affecting the performance of the main battery 10. Conversely, when the degree of deterioration of the main battery is large, the second predetermined temperature T1 may be set to a lower level as compared with the case where the degree of deterioration of the main battery 10 is small, so that deterioration of the main battery 10 can be curbed.

While the degree of deterioration of the main battery 10 may be specified by various methods, it may be specified based on the rate of reduction of SOC per unit time when the same electric power is generated, or may be specified based on the magnitude of the internal resistance.

In this connection, the relationship among the second predetermined temperature T1, third predetermined temperature T2, and the fourth predetermined temperature T3 is T2<T1<T3; therefore, when the second predetermined temperature T1 is set to a higher level, the third predetermined temperature T2 and the fourth predetermined temperature T3 are likewise set to higher levels according to the second predetermined temperature T1, so as to satisfy the relationship of T2<T1<T3. When the second predetermined temperature T1 is set to a lower level, the third predetermined temperature T2 and the fourth predetermined temperature T3 are likewise set to lower levels according to the second predetermined temperature T1, so as to satisfy the relationship of T2<T1<T3.

When the highest temperature of the main battery 10 is higher than the second predetermined temperature T1 or the fourth predetermined temperature T3, for example, over two or more trips, it is anticipated that deterioration of the main battery 10 has been progressing. Therefore, when the highest temperature of the main battery 10 is high, over two or more trips, the second predetermined temperature T1 may be set to a lower level as compared with the case where the highest temperature of the main battery 10 is low, so that deterioration of the main battery 10 can be curbed. In this connection, one trip is a period from the time when the ignition switch 27 is turned on, and the ECU is started, to the time when the ignition switch 27 is turned off, and the ECU is stopped, after predetermined traveling of the vehicle. The predetermined traveling refers to traveling while certain conditions, such as traveling for 10 min. or longer, continuous idling for 30 sec. or longer, and traveling for a while at a speed of 40 km/hour, are satisfied.

As explained above, the cooling system 80 of the vehicle-mounted secondary battery of this embodiment, and the electric vehicle 90 on which the cooling system 80 is installed, can appropriately cool the main battery 10 for driving the vehicle, while assuring sufficient chances of detection of an abnormality in the cooling fan 40.

Figure 11:
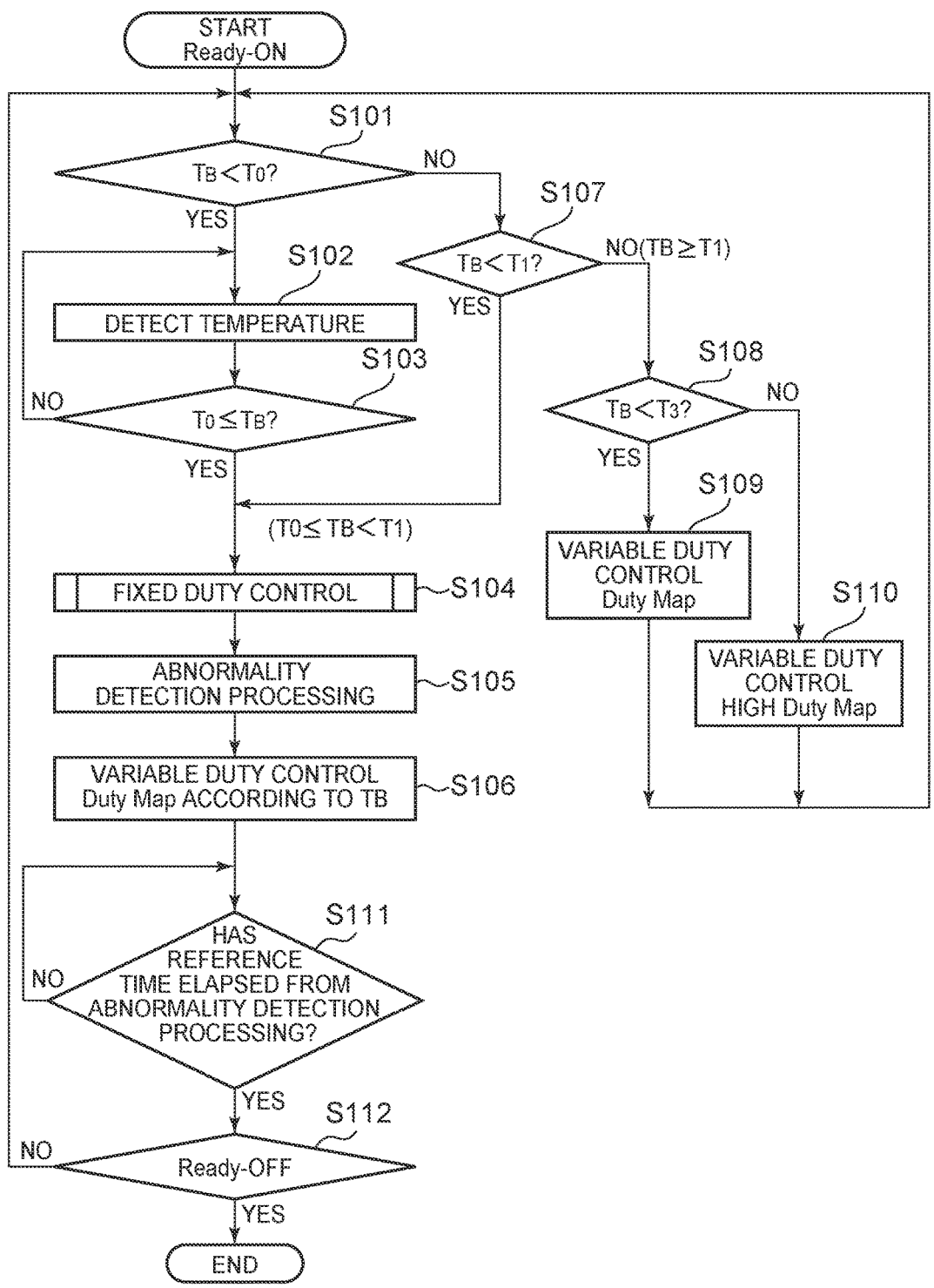
FIG. 11 is a flowchart illustrating another operation of the cooling system of FIG. 1 for the vehicle-mounted secondary battery according to the disclosed embodiment.

While the fixed duty control and abnormality detection processing of the cooling fan 40 are performed only once in one trip, in the embodiments as described above, they may be performed two or more times in one trip. For example, it may be regularly confirmed whether an elapsed time from execution of the abnormality detection processing is equal to or longer than a reference time, as indicated in step S111 of FIG. 11. If the elapsed time is equal to or longer than the reference time, the controller 70 may return to step S101, as shown in step S112, and determine whether execution conditions for fixed duty control and abnormality detection processing are satisfied again. If the conditions are satisfied, the fixed duty control and the abnormality detection processing may be performed. Thus, if the abnormality detection processing is regularly performed, an abnormality in the cooling fan 40 can be found at an earlier opportunity.

While the controller 70 calculates and generates the command duty D in the illustrated embodiment, the control unit 45 of the cooling fan 40 may calculate the command duty D, and control the motor 44 at the same time. Namely, the controller 70 may output information, such as the temperature TB of the main battery 10, needed for drive control of the cooling fan 40, to the control unit 45, and the control unit 45 may compute the duty ratio for driving the cooling fan 40, based on the information. While the cooling fan 40 is driven by the motor 44 in this embodiment, it may be driven by an AC motor. In this case, the control unit 45 may generate an AC drive waveform according to the duty ratio, and control the rotational speed of the AC motor.

In the embodiments as described above, the command duty D is determined using the duty map shown in FIG. 4, and variable duty control is performed in the region B of FIG. 4, when the temperature TB of the main battery 10 is equal to or higher than the fourth predetermined temperature T3. However, two or more types of duty maps may be stored in the memory 72, and a duty map to be used may be selected from these maps according to the temperature TB of the main battery 10. For example, a high duty map and a low duty map may be stored in the memory 72. In the high duty map, the command duty D is set to be relatively high, with respect to detected parameters, such as the temperature TB of the main battery 10, the intake air temperature of the cooling fan 40, the temperature in the vehicle interior, the vehicle speed Vel, the drive status of an air conditioner, current of the main battery 10, and the engine drive status. In the low duty map, the command duty D is set to be relatively low, with respect to the detected parameters. With the high duty map and the low duty map thus stored in the memory 72, a duty map to be used may be switched between the high duty map and the low duty map, based on the temperature TB of the main battery 10 and the drive status of the electric vehicle 90. In this case, when the temperature TB of the main battery 10 is equal to or higher than the fourth predetermined temperature T3, and the main battery 10 is to be rapidly cooled, or when noise of the cooling fan 40 causes no problem, the command duty D is determined based on the high duty map. When there is no problem, even if the cooling speed of the main battery 10 is slow, such as when the temperature TB of the main battery 10 is lower than the fourth predetermined temperature T3, or when noise of the cooling fan 40 creates a problem, the command duty may be determined based on the low duty map.

It is to be understood that this disclosure is not limited to the embodiments as described above, but includes all changes and modifications that do not depart from the technical scope and principles of the disclosure as specified in the appended claims.

What is claimed is:

1. A cooling system for a secondary battery, the secondary battery being installed on an electric vehicle for driving the electric vehicle, the cooling system comprising:
   a cooling fan configured to send cooling air to the secondary battery, the cooling fan being configured to be driven based on a command value, the command value being a parameter that determines a rotational speed of the cooling fan;
   a temperature sensor configured to detect a temperature of the secondary battery; and
   a controller configured to:
   drive the cooling fan at a fixed command value for a predetermined period when the temperature of the secondary battery becomes equal to or higher than a first predetermined temperature after the electric vehicle is started,
   detect a presence or absence of an abnormality in the cooling fan based on an actual rotational speed of the cooling fan during the predetermined period, and inhibit fixing the cooling fan at any fixed command value when the temperature of the secondary battery is equal to or higher than a second predetermined temperature that is higher than the first predetermined temperature, and drive the cooling fan at a variable command value.

2. The cooling system according to claim 1, wherein the second predetermined temperature is set to be lower as a degree of deterioration of the secondary battery increases.

3. The cooling system according to claim 1, wherein when a highest temperature of the secondary battery is higher than a predetermined value over a plurality of trips, the second predetermined temperature is set to a lower value as compared with a case where the highest temperature of the secondary battery is lower than or equal to the predetermined value over the plurality of trips.

4. The cooling system according to claim 1, wherein the fixed command value is set to a smaller value than the variable command value,
the variable command value is set when control is performed such that the command value can be varied according to the temperature of the secondary battery.

5. The cooling system according to claim 1, wherein when the temperature of the secondary battery is higher than a third predetermined temperature that is equal to or higher than the first predetermined temperature and lower than the second predetermined temperature, the fixed command value is set to a larger value than the variable command value,
the variable command value is set when control is performed such that the command value can be varied according to the temperature of the secondary battery.

6. The cooling system according to claim 1, wherein when the temperature of the secondary battery is lower than the first predetermined temperature when the electric vehicle is started, and exceeds the first predetermined temperature for the first time after starting of the electric vehicle, the fixed command value is set to a minimum value among command values for driving the cooling fan.

7. The cooling system according to claim 1, wherein when an input-output electric power of the secondary battery is smaller than a given threshold value, the fixed command value is set to a minimum value among command values for driving the cooling fan.

8. The cooling system according to claim 1, wherein when the temperature of the secondary battery is equal to or lower than a third predetermined temperature, the fixed command value is set to an intermediate value among command values for driving the cooling fan.

9. A cooling system for a secondary battery, the secondary battery being installed on an electric vehicle for driving the electric vehicle, the cooling system comprising:
a cooling fan configured to send cooling air to the secondary battery;
a temperature sensor configured to detect a temperature of the secondary battery; and
a controller configured to:
drive the cooling fan based on a command value, the command value being a parameter that determines a rotational speed of the cooling fan,
drive the cooling fan at a fixed command value for a predetermined period when the temperature of the secondary battery becomes equal to or higher than a first predetermined temperature after the electric vehicle is started,
inhibit driving of the cooling fan at any fixed command value when the temperature of the secondary battery is equal to or higher than a second predetermined temperature that is higher than the first predetermined temperature,
wherein the second predetermined temperature is set based on a level of deterioration of the secondary battery.

10. The cooling system according to claim 9, wherein the controller is configured to drive the cooling fan at a variable command value when the temperature of the secondary battery becomes higher than the second predetermined temperature after the electric vehicle is started.

* * * * *

UNITED STATES PATENT AND TRADEMARK OFFICE
CERTIFICATE OF CORRECTION

Page 1 of 1

PATENT NO.        : 10,381,695 B2
APPLICATION NO.   : 15/092089
DATED             : August 13, 2019
INVENTOR(S)       : Kiyoe Ochiai et al.

It is certified that error appears in the above-identified patent and that said Letters Patent is hereby corrected as shown below:

On the Title Page

Under (30) Foreign Application Priority Data:
Delete "Apr. 20, 2015 (JP) 2015-081078"
And insert -- Apr. 10, 2015 (JP) 2015-081078 --

Signed and Sealed this
First Day of October, 2019

Andrei Iancu
*Director of the United States Patent and Trademark Office*